US007963848B2

(12) United States Patent
Yoshizawa

(10) Patent No.: US 7,963,848 B2

(45) Date of Patent: Jun. 21, 2011

(54) GAMING MACHINE PAYING OUT CUMULATIVELY ACCUMULATED GAME MEDIA AND CONTROL METHOD THEREOF

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 77 days.

(21) Appl. No.: 12/266,005

(22) Filed: Nov. 6, 2008

(65) Prior Publication Data

US 2009/0203437 A1 Aug. 13, 2009

Related U.S. Application Data

(60) Provisional application No. 61/028,332, filed on Feb. 13, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .............. 463/27; 273/292; 463/17; 463/22; 463/16; 463/25

(58) Field of Classification Search ........................ None

See application file for complete search history.

(56) References Cited

U.S. PATENT DOCUMENTS

| | | | | |
|---|---|---|---|---|
| 5,413,351 | A | 5/1995 | Franklin | |
| 6,123,335 | A * | 9/2000 | Adkins | 273/292 |
| 6,746,328 | B2 * | 6/2004 | Cannon et al. | 463/17 |
| 7,364,507 | B2 * | 4/2008 | Baerlocher et al. | 463/25 |
| 2002/0090988 | A1 * | 7/2002 | Frost et al. | 463/17 |
| 2003/0073485 | A1 * | 4/2003 | Friedman | 463/22 |
| 2004/0009803 | A1 * | 1/2004 | Bennett et al. | 463/16 |
| 2006/0073887 | A1 * | 4/2006 | Nguyen et al. | 463/27 |
| 2007/0026947 | A1 | 2/2007 | Chun | |

FOREIGN PATENT DOCUMENTS

WO WO 2007/016776 A1 2/2007

* cited by examiner

*Primary Examiner* — Paul A. D'Agostino

(74) *Attorney, Agent, or Firm* — NDQ&M Watchstone LLP

(57) ABSTRACT

A gaming machine comprising a controller programmed to execute the processing of rolling and stopping the plurality of dice in the gaming portion, cumulatively accumulating, in a case where a normal BET has not been placed on the outcomes of dice satisfying any of plural kinds of predetermined conditions, or in a case where the outcomes of the stopped plurality of dice do not satisfy any of the plural kinds of predetermined conditions, a predetermined ratio of the game media which have been bet as the normal BET in association with respective outcomes of the dice satisfying any of the plural kinds of predetermined conditions, and offering, in a case where the outcomes of the stopped plurality of dice satisfy any of the plural kinds of predetermined conditions, the game media cumulatively accumulated in association with the outcomes of the plurality of dice.

11 Claims, 13 Drawing Sheets

GAMING MACHINE PAYING OUT CUMULATIVELY ACCUMULATED GAME MEDIA AND CONTROL METHOD THEREOF

CROSS-REFERENCE TO RELATED APPLICATIONS

This application claims benefit of priority based on U.S. Provisional Patent Application No. 61/028,332 filed on Feb. 13, 2008. The contents of this application are incorporated herein by reference in their entirety.

BACKGROUND OF THE INVENTION

1. Field of the Invention

The present invention relates to a gaming machine capable of paying out cumulatively accumulated game media and a control method thereof.

2. Discussion of the Background

There have been conventionally known a variety of table games, and for example, as disclosed in WO 07/016776-A1, US 2007/0026947-A1, and U.S. Pat. No. 5,413,351, a game genre called a dice game exists among those table games.

Among the dice games, there exists, for example, a gaming method in which a dealer throws dice after a player has performed a BET operation, and in a case where the dealer throws a predetermined combination, the player can throw dice to obtain a high payout, as disclosed in U.S. Pat. No. 5,413,351. Further, in Asia, Sic Bo is known as a long-time familiar dice game in which a player places a BET based on a prediction of the outcomes of three dice.

Sic Bo is widely known as an ancient Chinese dice game. In Sic Bo, a player places a BET based on a prediction of the outcomes of the respective three dice or a combination of the outcomes of the three dice. The way of placing a BET and payout rates are displayed on a table where a player is seated (or they may be displayed to an image display). The table is provided with: an area for placing a BET based on a prediction of the outcome of one die; an area for placing a BET based on a prediction that the outcomes of two dice will be the same; an area for placing a BET based on a prediction that the outcomes of the three dice will be the same; an area for placing a BET based on a prediction of a combination of the outcomes of two dice; an area for placing a BET based on a prediction of the total value of the outcomes of the three dice; and the like. As for the payout, although it cannot be uniformly set due to different circumstances of regions, countries, or the like, it has been set to the degree of 1:1 to 1:180 according to an appearance probability.

Since the dice game disclosed in U.S. Pat. No. 5,413,351 is executed according to a particular rule, there has been a problem that the game is unfamiliar to the player, lacks interesting aspects, and thus the player might soon be bored of the game.

An object of the present invention is to provide a gaming machine capable of enhancing interesting aspects of a game so as to prevent a player from becoming tired of the game, and a control method of the gaming machine.

The contents of WO 07/016776-A1, US 2007/0026947-A1, and U.S. Pat. No. 5,413,351 are incorporated herein by reference in their entirety.

SUMMARY OF THE INVENTION

The present invention provides a gaming machine having the following configuration.

Namely, the gaming machine includes a gaming portion, an input device, and a controller.

In the gaming portion, a plurality of dice roll and stop. The input device is a device with which a player can place a normal BET on outcomes of dice. The controller is programmed to execute the following (A) to (D):

(A) accepting from the input device an input indicating placement of normal BET of game media on the outcomes of dice, (B) rolling and stopping the plurality of dice in the gaming portion, (C) cumulatively accumulating, in a case where the normal BET has not been placed on the outcomes of the dice satisfying any of plural kinds of predetermined conditions in the processing (A), or in a case where the outcomes of the plurality of dice stopped in the processing (B) do not satisfy any of the plural kinds of predetermined conditions, a predetermined ratio of the game media which have been bet as the normal BET in the processing (A) in association with respective outcomes of the dice satisfying any of the plural kinds of predetermined conditions, and (D) offering, in a case where the outcomes of the plurality of dice stopped in the processing (B) satisfy any of the plural kinds of predetermined conditions, the game media cumulatively accumulated in association with the outcomes of the plurality of dice in the processing (C).

According to the above-mentioned gaming machine, a predetermined ratio of the game media bet as the normal BET are cumulatively accumulated in association with the outcomes of dice satisfying any of the plural kinds of the predetermined conditions, in the case where the normal BET has not been placed on the outcomes of the dice satisfying any of the plural kinds of the predetermined conditions (for example, all the outcomes are the same), or in the case where the outcomes of the plurality of dice do not satisfy any of the plural kinds of the predetermined conditions (cases except for "the case where the normal BET has been placed on the outcomes of dice satisfying any of the plural kinds of the predetermined conditions, and also the outcomes of the dice as a result of throwing the dice become identical with the bet outcomes of the dice", or in other words, the case where there is no winning among the outcomes of dice satisfying any of the plural kinds of the predetermined conditions (i.e. when the bet loses)). Moreover, in the case where the outcomes of the dice satisfy any of the plural kinds of the predetermined conditions (cases where winning occurs (i.e. when the bet wins) among the outcomes of dice satisfying any of the plural kinds of the predetermined conditions), the game media cumulatively accumulated in association with the bet outcomes of the dice are paid out. In this specification, winning refers to a condition in which, when the normal BET has been placed on outcomes of dice, the outcomes of dice as a result of throwing the dice become identical with the bet outcomes of dice.

For example, when the predetermined condition is a condition of "all the outcomes of dice being the same", the number of the cumulatively accumulated game media varies depending on the frequency of winning of the identical-number previously occurred in the game. For example, when winning of the outcomes of (1, 1, 1) occurred relatively short while ago, the number of the game media cumulative accumulated in association with the outcomes of (1, 1, 1) is not so many. On the other hand, when winning of the outcomes of (6, 6, 6) has not occurred for a long period of time, the number of the game media cumulatively accumulated in association with the outcomes of (6, 6, 6) may be very large.

As mentioned above, the number of game media cumulatively accumulated in association with the outcomes of the dice which has not been won for a long period of time may be very large. This can make the player have a sense of expectation that the game media cumulatively accumulated in association with such outcomes of the dice may be offered. As a result of this, it is possible to provide a game in which the player hardly feels bored even when the game is played for a long period of time.

Moreover, since the number of the cumulatively accumulated game media is different depending on the outcomes of dice satisfying respective predetermined conditions, it becomes possible to make the player presume which outcomes of the dice tend to appear based on the differences. As a result, interesting aspects of the game can be enhanced.

The above-mentioned gaming machine desirably has the following configuration.

The predetermined condition is that all the outcomes of each of the dice are the same. Further, the processing (C) is a processing of cumulatively accumulating, in a case where no input indicating placement of the normal BET has been made on the outcomes of the dice in which all the outcomes of each of the dice are the same in the processing (A), or in a case where at least one of the outcomes of the dice is different from the other outcomes of the dice among the plurality of dice stopped in the processing (B), a predetermined ratio of the game media which have been bet as the normal BET in the processing (A), in association with outcomes of the dice in which all the outcomes of each of the dice are the same. Moreover, the processing (D) is processing of offering, in a case where all the outcomes of each of the plurality of dice stopped in processing (B) are the same, the game media cumulatively accumulated in association with said same outcomes of the dice in processing (C).

According to the above-mentioned gaming machine, offering of the cumulatively accumulated game media is performed when all the outcomes of each of the dice are the same (when the outcomes of the dice are identical). Since possibility of the outcomes of the dice being identical is slim, the player normally has a kind of thrilling feeling when all the outcomes of the dice are identical. According to the above-mentioned gaming machine, the cumulatively accumulated game media are offered upon establishment of the identical outcomes having a special meaning to the player. Therefore, it is possible to drastically enhance sensation of the player.

Desirably, the above-mentioned gaming machine further has the following configuration.

Namely, the processing (C) is processing of cumulatively accumulating, in a case where the input indicating placement of the normal BET on the outcomes of dice satisfying any of the plural kinds of the predetermined conditions has been made in the processing (A), and also the outcomes of the plurality of dice stopped in the processing (B) are different from the outcomes of the dice on which the normal BET has been placed, the game media bet as the normal BET on the outcomes of the dice, in association with the bet outcomes of the dice.

According to the above-mentioned gaming machine, the primary source of the game media to be offered when the outcomes of the dice satisfy any of the plural kinds of the predetermined condition is the game media which have been bet as the normal BET on the outcomes of the dice satisfying any of the plural kinds of the predetermined condition. Accordingly, since the outcomes of the dice to be a condition for offering the payout are common with the outcomes of the dice relating to the funding source of the payout, it is possible to make the player strongly recognize that the payout is offered due to satisfaction of the predetermined condition. It is therefore possible to provide the player with a satisfying feeling.

Desirably, the above-mentioned gaming machine further has the following configuration.

Namely, the processing (D) is processing of offering, in a case where the outcomes of the plurality of dice stopped in the processing (B) satisfy any of the plural kinds of predetermined conditions, the game media cumulatively accumulated in association with the outcomes of the plurality of dice in the processing (C) based on the amount of the game media which have been bet as the normal BET in the processing (A).

According to the above-mentioned gaming machine, offering of the cumulatively accumulated game media is performed based on the amount of game media bet as the normal BET. Therefore, a larger amount of game media bet as the normal BET may increase the chance of receiving payout of the cumulatively accumulated game media. Accordingly, it is possible to prompt the player to place the normal BET with a larger amount of game media, and thus the amount of the cumulatively accumulated game media can be increased. Therefore it is possible to further increase the player's interests in obtaining the cumulatively accumulated game media.

Desirably, the above-mentioned gaming machine further has the following configuration.

Namely, the processing (D) is processing of offering, in a case where the outcomes of the plurality of dice stopped in the processing (B) satisfy any of the plural kinds of predetermined conditions, and also an input indicating placement of the normal BET on the outcomes of the plurality of dice has been made in the processing (A), the game media cumulatively accumulated in association with the outcomes of the plurality of dice in the processing (C).

According to the above-mentioned gaming machine, offering of the cumulatively accumulated game media is performed when the outcomes of the dice satisfy any of the plural kinds of the predetermined conditions and also the normal BET has been placed on the outcomes of the dice (i.e. upon winning of the normal BET). Therefore, since the offering of the game media due to the winning of the normal BET and the offering of the cumulatively accumulated game media are simultaneously performed, it is possible to further increase the player's satisfying feeling.

Desirably, the above-mentioned gaming machine further has the following configuration.

Namely, in the gaming machine, each of the plurality of stations is provided with the input device. The processing (A) is processing of accepting, from the input devices provided in each of the stations, an input indicating placement of the normal BET of game media on outcomes of the dice. Also, the processing (D) is processing of offering, in a case where the outcomes of the plurality of dice stopped in the processing (B) satisfy any of the plural kinds of predetermined conditions, and also there are a plurality of the stations each provided with the input device from which the input of the normal BET on the outcomes of the plurality of dice has been made in the processing (A), the game media cumulatively accumulated in association with the outcomes of the plurality of dice in the processing (C) based on the amount of the game media which have been bet as the normal BET from the input devices provided in each of the stations.

According to the above-mentioned gaming machine, offering of the cumulatively accumulated game media is performed based on the amount of game media which have been bet as the normal BET, when the outcomes of the dice satisfy any of the plural kinds of the predetermined condition and also there are a plurality of the stations each provided with the input device from which the input indicating placement of the normal BET on the outcomes of the dice has been made. Namely, in a case where there are a plurality of the players who are candidates to receive offering of the cumulatively accumulated game media, the decision as to which player is provided with the cumulatively accumulated game media is made based on the amount of the game media bet as the normal BET by each of the plurality of the player.

Therefore, the normal BET of a larger amount of game media may result in a higher chance of receiving the offering of the cumulatively accumulated game media. Accordingly, it is possible to prompt the player to place the normal BET with a larger amount of game media, and thus the amount of the cumulatively accumulated game media can be increased. Therefore it is possible to further increase the player's interests in obtaining the thus cumulatively accumulated game media.

The present invention further provides a method for controlling the gaming machine having the following configuration.

Namely, the input device is capable of placing a side BET different from the normal BET. Further, the controller is programmed to further execute processing (A') of accepting an input indicating placement of the side BET of game media from the input device. Moreover, the processing (C) is processing of cumulatively accumulating the game media which have been bet as the normal BET in the processing (A) and/or a predetermined ratio of the game media which have been bet as the side BET in the processing (A'), in association with the respective outcomes of the dice satisfying any of the plural kinds of predetermined conditions, in a case where any normal BET has not been placed on the outcomes the dice satisfying any of the plural kinds of the predetermined conditions, or the outcomes of the plurality of the dice stopped in the processing (B) do not satisfy any of the plurality kinds of the predetermined conditions. Further, the processing (D) is processing of offering, in a case where the outcomes of the plurality of dice stopped in the processing (B) satisfy any of the plural kinds of predetermined conditions, the game media cumulatively accumulated in association with the outcomes of the plurality of dice in the processing (C) on condition that an input indicating placement of the side BET has been made in the processing (A').

According to the above-mentioned gaming machine, it is possible to place two types of BETs, which are a normal BET and a side BET. Further, placement of the side BET is necessary in order to be offered the cumulatively accumulated game media. Thus, it becomes possible to make the player think about game strategies such as how to best increase the game media by using the limited number of game media on hand (e.g. on which to spend a larger amount of game media, the normal BET or the side BET?), or the like. As a result, it becomes possible to enhance interesting aspects of the game so that it is possible to provide a game in which the player hardly feels bored even when the game is played for a long period of time.

The present invention further provides a control method for a gaming machine having the following configuration.

Namely, the above-mentioned controlling method includes the steps of (A) accepting from an input device an input indicating placement of a normal BET of game media on outcomes of dice, (B) rolling and stopping a plurality of dice in a gaming portion, (C) cumulatively accumulating, in a case where the normal BET has not been placed on the outcomes of the dice satisfying any of plural kinds of predetermined conditions in the step (A), or in a case where the outcomes of the plurality of dice stopped in the step (B) do not satisfy any of the plural kinds of predetermined conditions, a predetermined ratio of the game media which have been bet as the normal BET in the step (A) in association with respective outcomes of the dice satisfying any of the plural kinds of the predetermined conditions, and (D) offering, in a case where the outcomes of the plurality of dice stopped in the step (B) satisfy any of the plural kinds of predetermined conditions, the game media cumulatively accumulated in association with the outcomes of the plurality of dice in the step (C).

According to the above-mentioned controlling method of the gaming machine, a predetermined ratio of the game media bet as the normal BET are cumulatively accumulated in association with the outcomes of dice satisfying any of the plural kinds of the predetermined conditions, in the case where the normal BET has not been placed on the outcomes of the dice satisfying any of the plural kinds of the predetermined conditions (for example, all the outcomes are the same), or in the case where the outcomes of the plurality of dice do not satisfy any of the plural kinds of the predetermined conditions (cases except for "the case where the normal BET has been placed on the outcomes of dice satisfying any of the plural kinds of the predetermined conditions, and also the outcomes of the dice as a result of throwing the dice become identical with the bet outcomes of the dice", or in other words, the case where there is no winning among the outcomes of dice satisfying any of the plural kinds of the predetermined conditions (i.e. when the bet loses)). Moreover, in the case where the outcomes of the dice satisfy any of the plural kinds of the predetermined conditions (cases where winning occurs (i.e. when the bet wins) among the outcomes of dice satisfying one of the plural kinds of the predetermined conditions), the game media cumulatively accumulated in association with the bet outcomes of the dice are paid out. In this specification, winning refers to a condition in which, when the normal BET has been placed on outcomes of dice, the outcomes of dice as a result of throwing the dice become identical with the bet outcomes of dice.

For example, when the predetermined condition is a condition of "all the outcomes of dice being the same", the number of the cumulatively accumulated game media varies depending on the frequency of winning of the identical-number previously occurred in the game. For example, when winning of the outcomes of (1, 1, 1) occurred relatively short while ago, the number of the game media cumulative accumulated in association with the outcomes of (1, 1, 1) is not so many. On the other hand, when winning of the outcomes of (6, 6, 6) has not occurred for a long period of time, the number of the game media cumulatively accumulated in association with the outcomes of (6, 6, 6) may be very large.

As mentioned above, the number of game media cumulatively accumulated in association with the outcomes of the dice which has not been won for a long period of time may be very large. This can make the player have a sense of expectation that the game media cumulatively accumulated in association with such outcomes of the dice may be offered. As a result of this, it is possible to provide a game in which the player hardly feels bored even when the game is played for a long period of time.

Moreover, since the number of the cumulatively accumulated game media is different depending on the outcomes of dice satisfying respective predetermined conditions, it becomes possible to make the player presume which outcomes of the dice tend to appear based on the differences. As a result, interesting aspects of the game can be enhanced.

DESCRIPTION OF THE EMBODIMENTS

First, a general description of the present embodiment is given using FIGS. 1A to 1D.

Figure 1A:
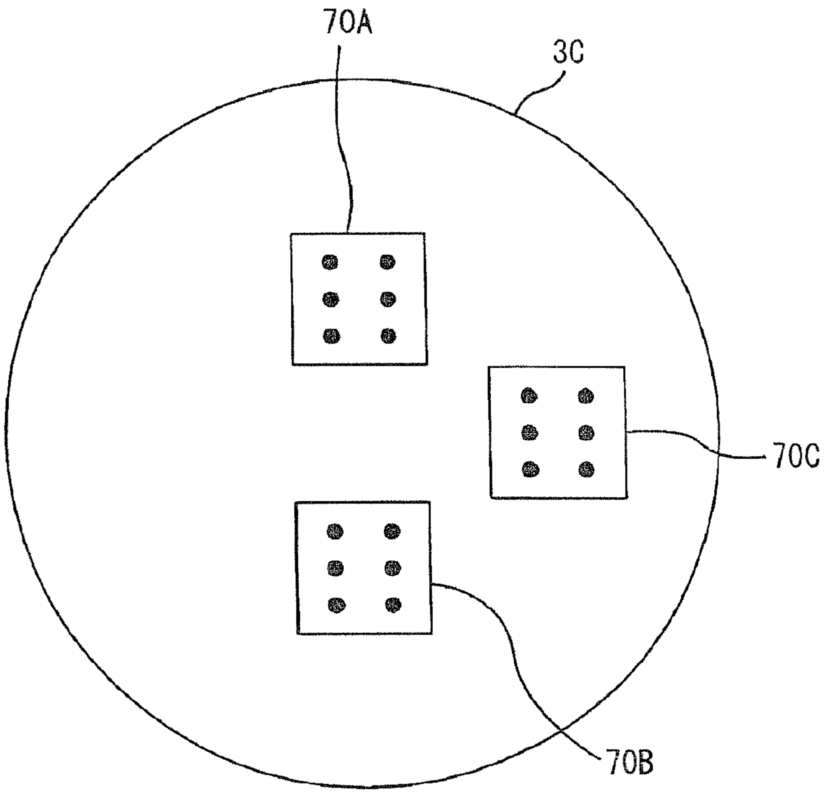
FIG. 1A is a view showing outcomes of dice obtained as a result of throwing the dice.

FIG. 1A is a view showing the outcomes of dice obtained as a result of throwing the dice.

Figure 1B:
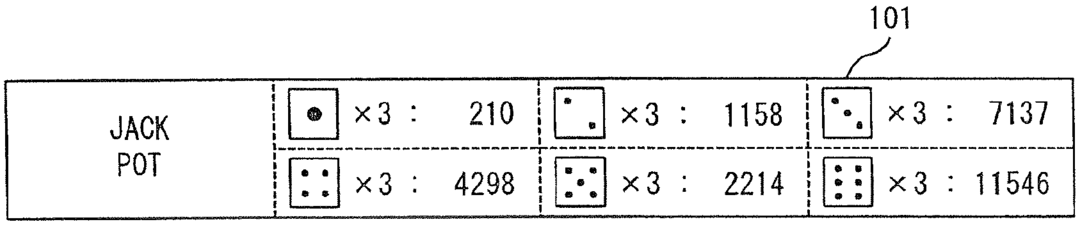
FIG. 1B is a view showing a JACKPOT image.

FIG. 1B is a view showing a JACKPOT image.

Figure 1C:
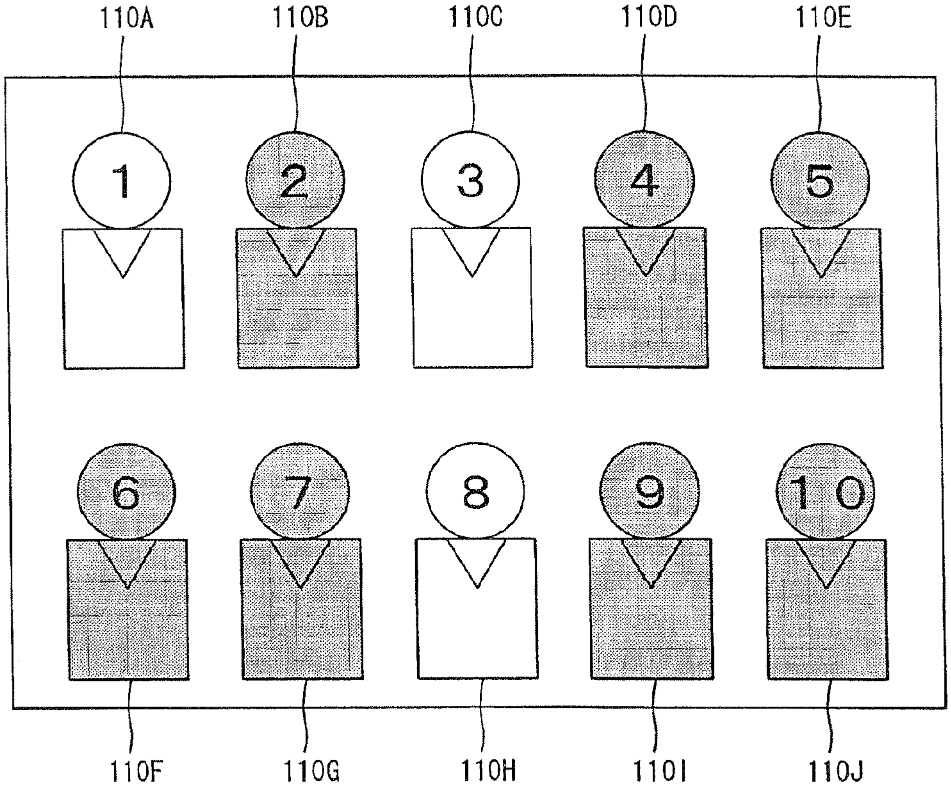
FIG. 1C is a view showing one example of a display screen displayed to the image display.
Figure 1D:
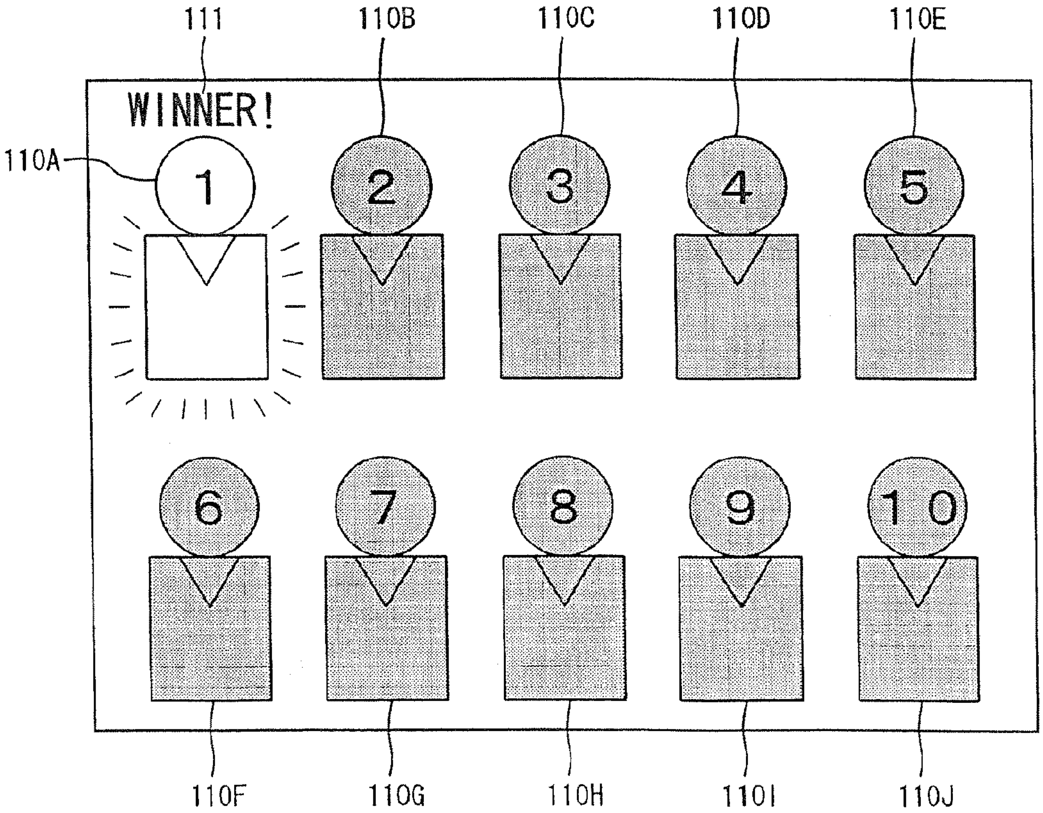
FIG. 1D is a view showing one example of a display screen displayed to the image display

FIGS. 1C and 1D are views each showing one example of display screens displayed to an image display.

In a gaming machine 1 (see FIG. 2) according to the present embodiment, three dice are used to perform a dice game (Sic Bo). A player can place a normal BET while predicting the outcomes of the dice (see FIG. 6). Further, the player can place a BET with an arbitrary number of game media as a side BET.

In the case where all the outcomes of each of the dice are identical (see FIG. 1A) at a station 4 where a normal BET has been placed on the above-mentioned outcomes of the dice and further a side BET has been placed, there is a chance of offering the cumulatively accumulated game media (so called progressive JACKPOT payout). In this specification, the status where all the outcomes of each of the dice are identical is also referred to as a status where "outcomes of the dice are identical."

In the present embodiment, the game media to be the subject of the progressive JACKPOT payout is accumulated in the following manner.

(i) The number of game media cumulatively accumulated in association with any of the identical numbers (1, 1, 1), (2, 2, 2), (3, 3, 3), (4, 4, 4), (5, 5, 5), (6, 6, 6) is stored in a predetermined area (JACKPOT storage area) of the RAM 83 (see FIG. 7) installed in the gaming machine 1.

(ii) The amount of game media cumulatively accumulated in association with each of the identical numbers is displayed as a JACKPOT image 101 (see FIG. 1B) to the image display 7 (see FIG. 2) installed in each of the stations 4. The JACKPOT image 101 is to be displayed to a BET screen 40 (see FIG. 6).

(iii) In a case where the normal BET has been placed on any of the identical numbers, and the outcomes of the dice are not the relevant identical number (i.e. when the BET loses), the amount of game media bet on the identical number as the normal BET is cumulatively accumulated in association with the relevant identical number in the JACKPOT storage area of RAM 83.

For example, when all the outcomes of the dice turn out to be the same number of 6, at the station 4 where the normal BET has been placed on the identical number of 6 and further the side BET has been placed, there is a chance that game media in the number cumulatively accumulated (11546) (see FIG. 1B) in association with the identical number of 6 is offered.

When all the outcomes of the dice are identical, in the case where there are a plurality of the stations 4 where the normal BET has been placed on the relevant outcomes of the dice and further the side BET has been placed, one of the stations 4 is determined so that the progressive JACKPOT payout is offered at the determined station 4.

Here, the station 4 where the progressive JACKPOT payout is to be performed is the station 4 where the side BET has been placed with the largest number of the game media.

In the present embodiment, when all the outcomes of the dice are identical, in the case where there are a plurality of the stations 4 where the normal BET has been placed on the relevant outcomes of the dice (hereinafter, also referred to as winning identical-number outcomes) and further the side BET has been placed, players images 110A to 110J are displayed to the image display 7 (see FIG. 2) as shown in FIG. 1C. Here, the player images 110A, 110C, and 110H, which are displayed in white, correspond to the stations 4 where the normal BET has been placed on the winning identical-number outcomes and further the side BET has been placed. In other words, it is shown that three players have placed the normal BET on the winning identical-number outcomes and also placed the side BET.

The progressive JACKPOT payout is offered to the player who has placed the side BET with the largest number of the game media among the three players. In the example shown in FIG. 1D, it is shown that the player who is playing the game at the station 4, which corresponds to the player image 110A, has placed the side BET with the largest amount of game media. Above the player image 110A is shown a character image 111 "WINNER!" indicating that the player is determined as the player who will receive the progressive JACKPOT payout.

The general description of the present embodiment has been described above.

Statuses of "all outcomes of dice are 1", "all outcomes of dice are 2", "all outcomes of dice are 3", "all outcomes of dice are 4", "all outcomes of dice are 5" and "all outcomes of dice are 6" constitute the plural kinds of the predetermined conditions in the present invention.

In the following, the present embodiment will be further specifically described.

Figure 2:
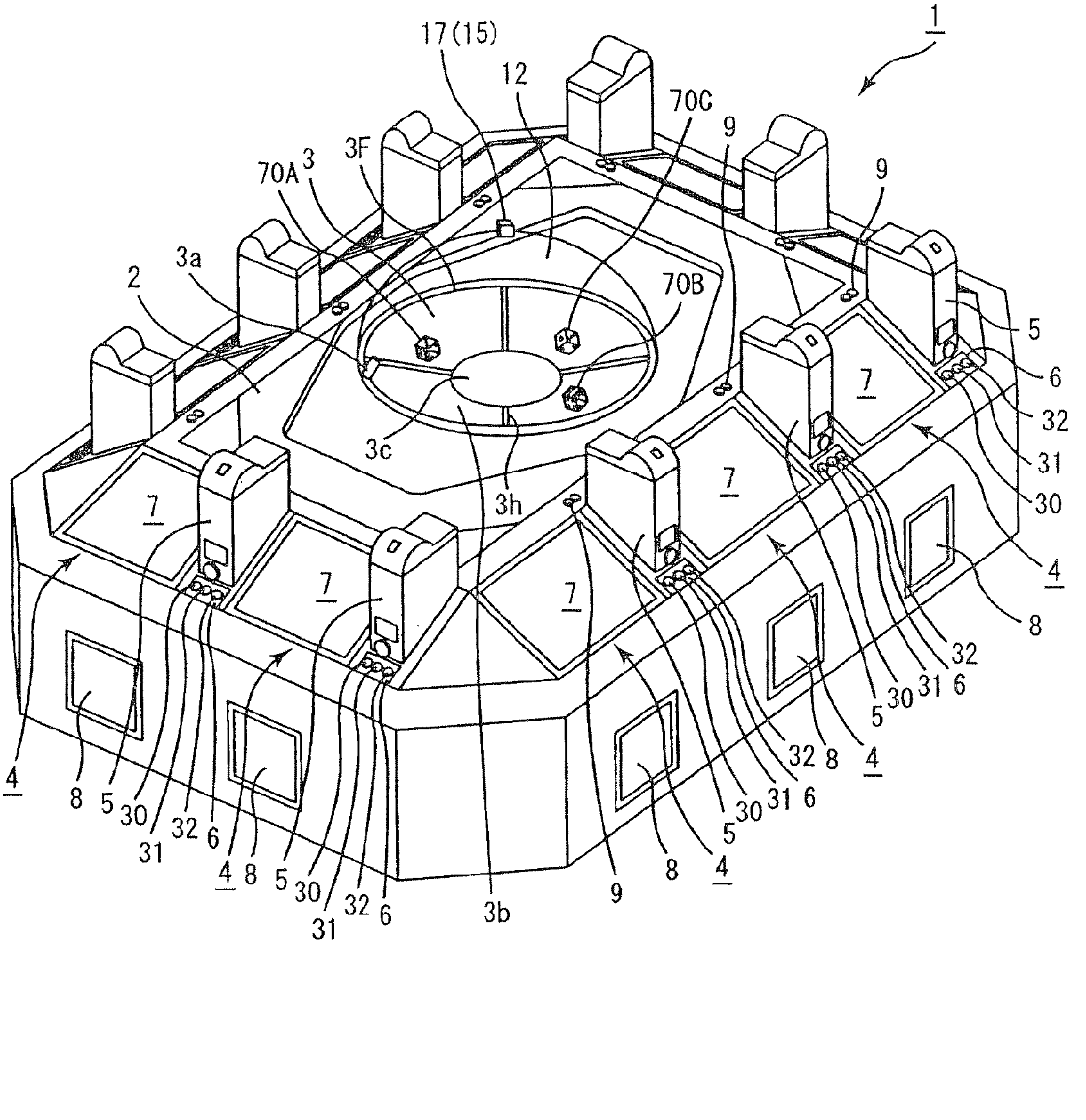
FIG. 2 is a perspective view schematically showing one example of a gaming machine according to the present invention.

FIG. 2 is the perspective view schematically showing one example of the gaming machines according to the present embodiment.

Figure 3:
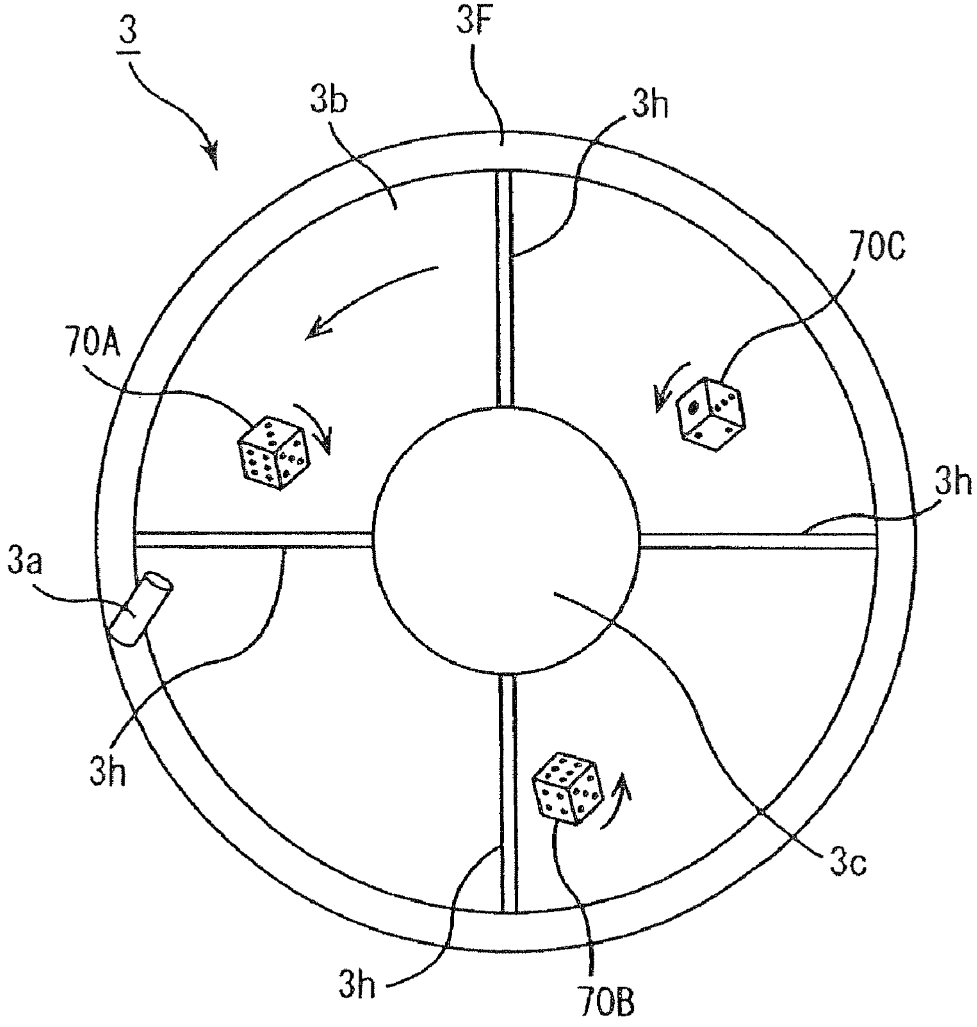
FIG. 3 is an enlarged view of a gaming portion of the gaming machine shown in FIG. 2.

FIG. 3 is an enlarged view showing the gaming portion of the gaming machine shown in FIG. 2.

Figure 4:
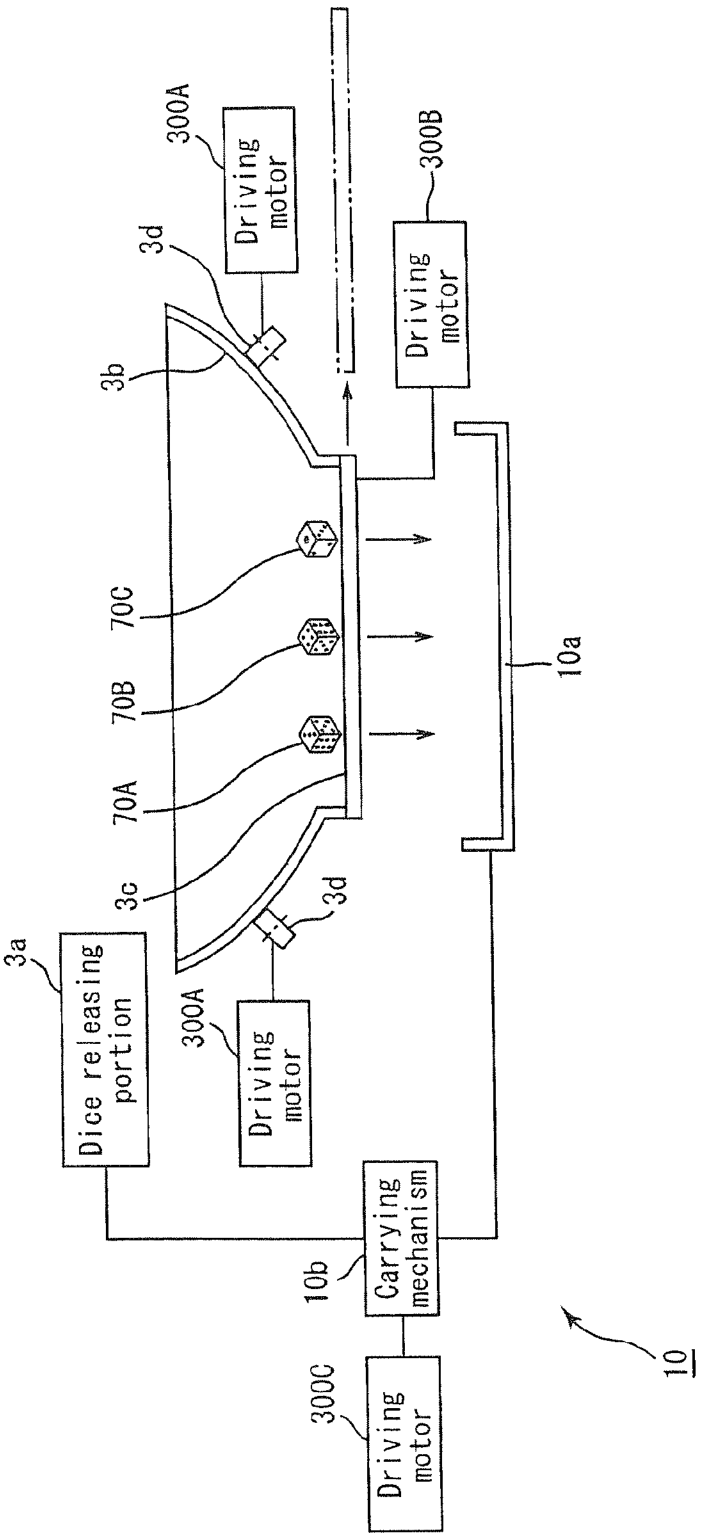
FIG. 4 is a view schematically showing a channel from collection to release of dice in the gaming portion.

FIG. 4 is a view schematically showing a channel from collection to release of the dice in the gaming portion.

As shown in FIG. 2, the gaming machine 1 of the present embodiment includes a cabinet 2 serving as a main body portion, a gaming portion 3 in which a plurality of dice 70 roll and stop, disposed almost at the center of the upper surface of the cabinet 2, and a plurality of (10 units in the present embodiment) stations 4 disposed so as to surround the gaming portion 3. Each of the stations 4 includes an image display 7. A player seated at each of the stations takes part in a game by putting in a normal BET and a side BET based on a prediction of the outcomes of the dice 70.

Each of the stations 4 includes a game media accepting device 5 into which game media such as medals for use in a game are inserted, a control portion 6 having a plurality of control buttons and the like, with which a player inputs predetermined commands, and the image display 7 to which an image regarding a BET table and the like are displayed. The player can participate in a game by operating the control portion 6 while watching the image displayed to the image display 7.

On the side surfaces of the cabinet 2 where the stations 4 are installed, there are provided for each station 4 a payout exit 8 from which the game media are paid out. Further, on the right side above the image display 7 of each station 4, speakers 9 capable of outputting a sound are provided.

The control portion 6is provided beside the image display 7 of the station 4. In the control portion 6, a confirmation button 30, a payback button 31 and a help button 32 are arranged in the order from the left, when seen from a position facing to the station 4.

The confirmation button 30 is pressed when a BET operation is confirmed after the BET operation has been performed. Further, for operations other than the BET operations, the player also presses the confirmation button 30 to confirm an input that the player has made.

The payback button 31 is typically pressed after a game has been ended. When the payback button 31 is pressed, game media according to credits owned by the player is paid back from the payout exit 8.

The help button 32 is pressed when the game playing manner or the like is unclear. Immediately after the help button 32 is pressed, a help image showing information on a variety of operations is displayed to the image display 7.

In the gaming portion 3, the plurality of the dice 70 are rolled and stopped. In the present embodiment, the gaming machine 1 has a configuration in which three dice 70 (a die 70A, a die 70B and a die 70C) are used in the gaming portion 3.

The gaming portion 3 is formed in a circular shape and includes a dice releasing portion 3*a* from which the dice 70 are released, a rotating plate 3*b* that rotates the dice 70 sequentially released from the dice releasing portion 3*a*, and a stopping plate 3*c* that finally stops the dice 70 rotating on the rotating plate 3*b*.

The dice releasing portion 3*a* is installed in a circular outer frame 3F configuring the gaming portion 3, and from here, the dice 70A to 70C are sequentially (or simultaneously) released toward the rotating plate 3*b*. It is to be noted that in FIGS. 2 and 3, the dice 70 are drawn in a large size as compared with the dice releasing portion 3*a* for the sake of facilitating the description.

The rotating plate 3*b* has a shape of a truncated cone, as shown in FIG. 4. On the lower surface portion of the rotating plate 3*b*, a plurality of driving rollers 3*d* are rotatably provided in a state in contact with the rotating plate 3*b*. Simultaneously with start of a game, the plurality of the rotating rollers 3*d* are rotationally driven by a rotating-plate driving motor 300A, to rotationally drive the rotating plate 3*b*. It is to be noted that on the front surface of the rotating plate 3*b*, projections 3*h* are provided at predetermined intervals, which flip the respective dice so as to facilitate rolling thereof when the rotating plate 3*b* is rotationally driven.

The stopping plate 3*c* is configured in a circular plate shape at the bottom portion of the rotating plate 3*b* having a shape of a truncated cone, and is an area where the dice 70 rotating on the rotating plate 3*b* finally stop after dropping along the inclination of the rotating plate 3*b* following the stop of the rotating plate 3*b*. Namely, the dice 70 released from the dice releasing portion 3*a* rotate on the surface of the rotating plate 3*b* by rotation of the rotating plate 3*b*, and drop along the inclination of the rotating plate 3*b* with the stop of the rotating plate 3*b*. Then, the dice 70 finally stop on the stopping plate 3*c*.

As shown in FIG. 4, the stopping plate 3*c* is configured to be slidingly driven by a stopping-plate driving motor 300B. With the stopping plate 3*c* slidingly driven, the dice 70 drop toward a collection/release mechanism 10.

The collection/release mechanism 10 includes: a housing portion 10*a* that receives the dice 70 having dropped from the stopping plate 3*c*; a carrying mechanism 10*b* that carries the dice 70 inside the housing portion 10*a* toward the dice releasing portion 3*a*; and a carriage driving motor 300C that drives the carrying mechanism 10*b*. The configuration of the collection/release mechanism 10 is not limited to a specific form, so long as it is a configuration capable of collecting the dice 70 after a later-described outcome detecting device 15 has completed detection of the outcomes of the respective dice 70 having stopped on the stopping plate 3*c*, and releasing the dice 70 from the dice releasing portion 3*a*, toward the rotating plate 3*b*. Namely, for example, the carrying mechanism 10*b* can be conducted in a variety of forms, such as a configuration in which the carrying mechanism 10*b* carries the dice 70 by air pressure from the housing portion 10*a* toward the dice releasing portion 3*a*, and a configuration in which the carrying mechanism 10*b* carries the dice 70 by a conveyor-like carrier from the housing portion 10*a* toward the dice releasing portion 3*a*.

The gaming portion 3 is covered at its whole upper portion by a hemispheric covering member 12 made of transparent acrylic, and the rotating range of the dice 70 is regulated. In the present embodiment, the outcome detecting device 15 that detects the outcomes of the dice 70 is installed on the top of the covering member 12. It is to be noted that in FIG. 2, the covering member 12 is drawn so as to cover only part of the gaming portion 3 for the sake of facilitating the description.

Figure 5:
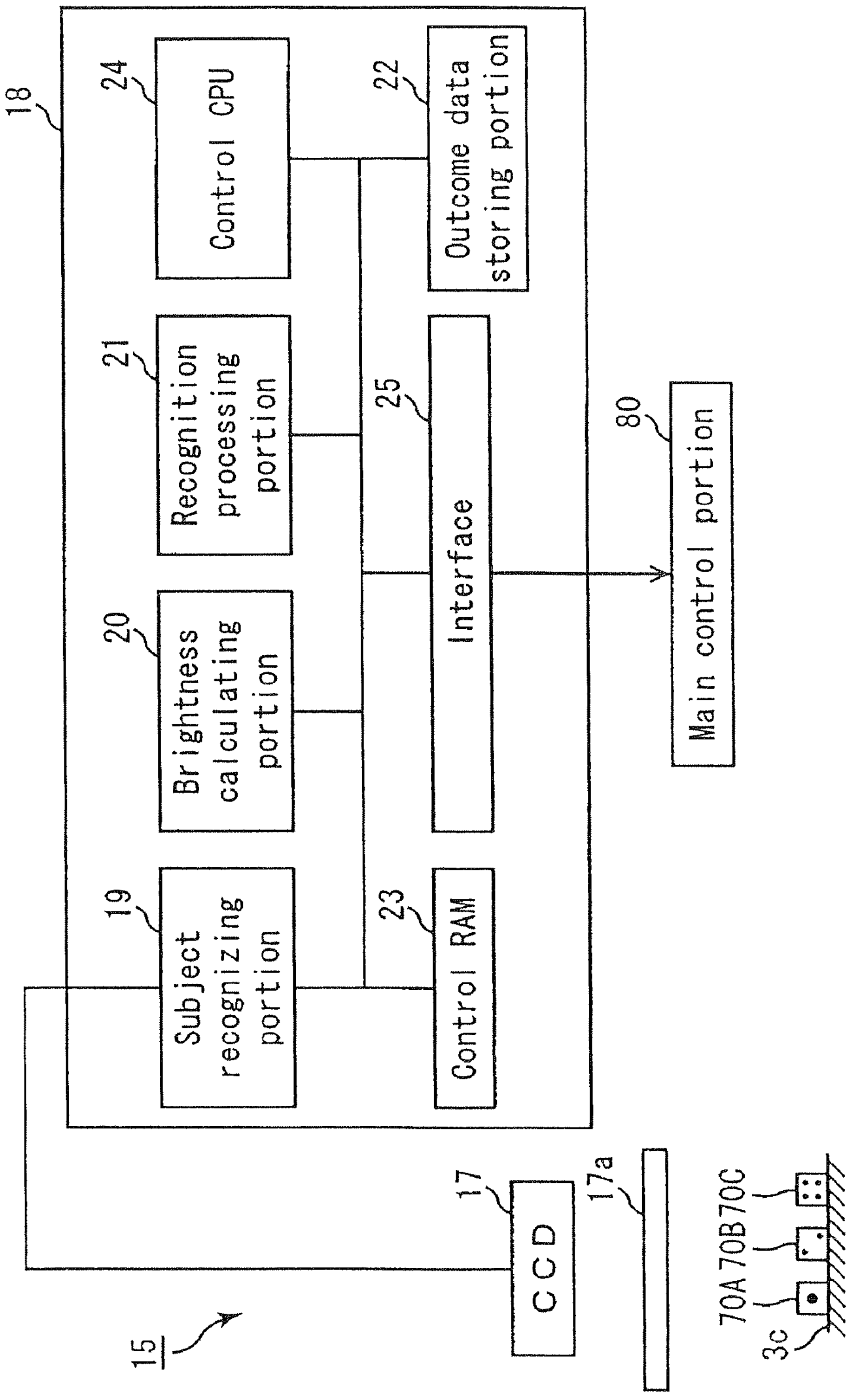
FIG. 5 is a block diagram showing an internal configuration of an outcome detecting device in the gaming machine shown in FIG. 2.

FIG. 5 is a block diagram showing an internal configuration of the outcome detecting device in the gaming machine shown in FIG. 2.

The outcome detecting device 15 in the present embodiment includes an imaging device (CCD camera) 17 that photographs the dice 70 being the object to be photographed, and an outcome detecting circuit 18 that processes the imaging signal from the imaging device 17 and then detects the outcomes of the dice 70.

The imaging device 17 is previously made by a focus lens 17*a* to have a focus consistent with the stopping plate 3*c* in order to photograph the dice 70 on the stopping plate 3*c*, and is exposure-controlled. The outcome detecting circuit 18 includes: a subject recognizing portion 19 that receives an imaging signal from the imaging device 17 to recognize a position of a subject (dice 70); a brightness calculating portion 20 that calculates brightness of the image of the subject (image of the dice) recognized in the subject recognizing portion 19; a recognition processing portion 21 that identifies the outcomes of the dice 70; an outcome data storing portion 22 in which comparison data regarding the outcomes of the dice 70 is stored; a control RAM 23; and a control CPU 24 that controls these units. These units are connected to one another through a bus, and each of these units is controlled by the control CPU 24.

From the imaging signal of the dice 70 received from the imaging device 17, intensity distribution of the image is measured in the subject recognizing portion 19. Measuring the intensity distribution allows identification of the positions of the dice 70 on the stopping plate 3*c* and the surface states of the dice 70. In the recognition processing portion 21, the identified data is subjected to processing of comparison with the comparison data previously stored in the outcome data storing portion 22, to identify the outcomes of the dice 70.

The identified outcome information is stored into the control RAM 23, and transmitted to a later-described main control portion 80 through an interface 25. Namely, the outcome detecting device 15 identifies the outcomes of the three dice 70 having stopped in the gaming portion 3, and transmits the identified outcome information to the main control portion 80.

Figure 6:
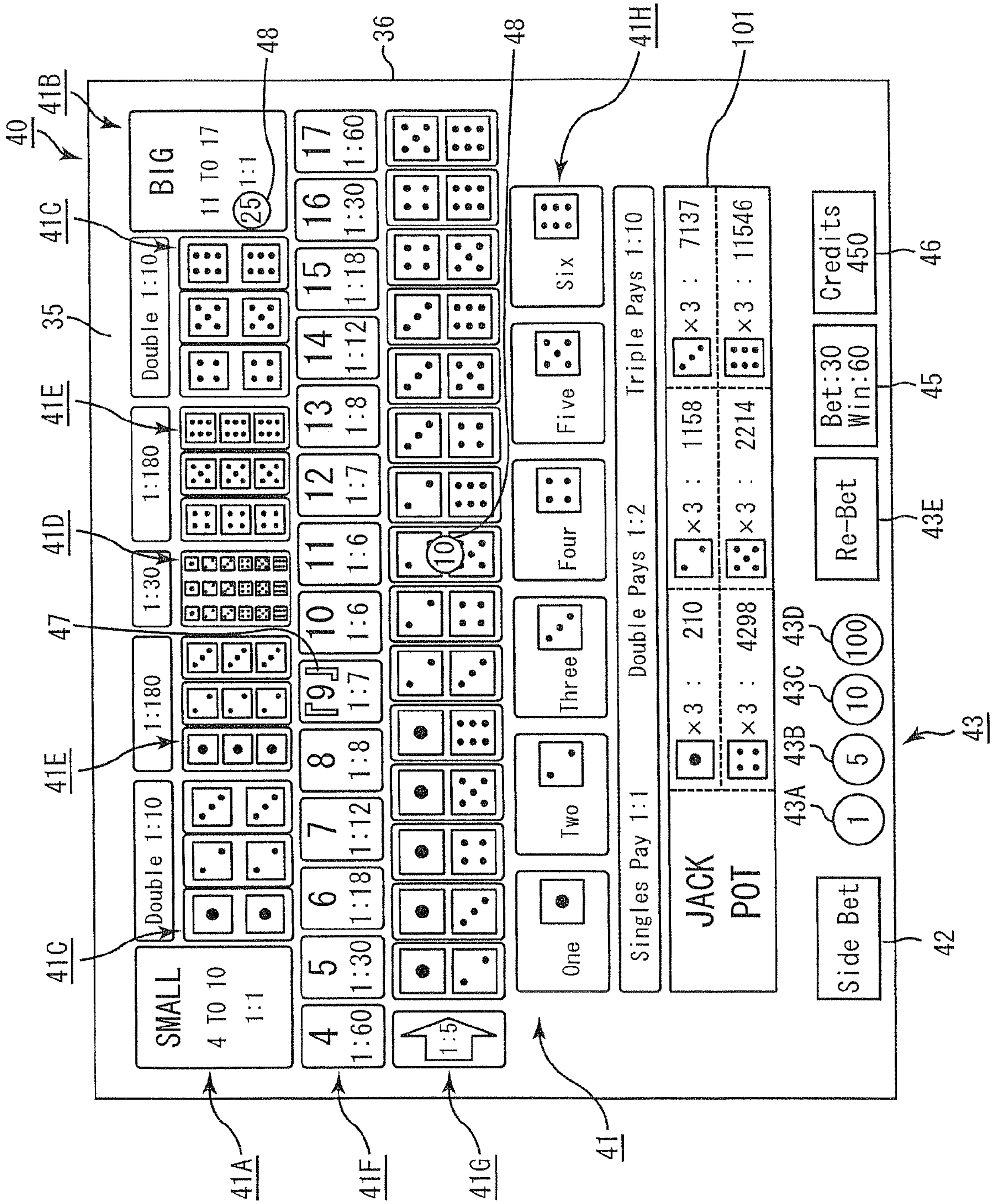
FIG. 6 is a view showing one example of a display screen displayed to the image display.

FIG. 6 is an exemplary view showing the display screen displayed to the image display.

As shown in FIG. 6, the image display 7 is a touch-panel-type liquid crystal display having a touch panel 35 installed on its front surface. The player can select an icon and the like displayed to the liquid crystal screen 36 by touching the touch panel 35 with his/her finger or the like. The touch panel 35 corresponds to the input device in the present invention.

During the game, a table-type betting board (BET screen) 40 to be used for predicting the outcomes of the dice 70 is displayed at a predetermined timing.

The following describes the BET screen 40 in more detail.

On the BET screen 40, a plurality of normal BET areas 41 (normal BET area 41A, normal BET area 41B, normal BET area 41C, normal BET area 41D, normal BET area 41E, normal BET area 41F, normal BET area 41G, normal BET area 41H) and a side BET area 42 are displayed. A normal BET operation is performed by touching the touch panel 35 with a finger or the like to specify the normal BET area 41, and making chips displayed on the specified normal BET area 41. Further, a side BET operation is performed by touching the touch panel 35 with a finger or the like to specify the side BET area 42, and making chips displayed on the specified side BET area 42.

In the right portion of the side BET area 42, there are displayed a unit BET button 43, a Re-BET button 43E, a payback result display portion 45, and a number-of-credits display portion 46 in order from the left.

The unit BET button 43 is used for betting a chip on the normal BET area 41 and the side BET area 42 specified by the player. The unit BET button 43 is configured by four types of buttons: a 1-BET button 43A; a 5-BET button 43B; a 10-BET button 43C; and a 100-BET button 43D. It is to be noted that, when the BET operation is wrongly performed, it can be performed again by touching a Re-BET button 43E with the finger or the like.

The player first touches the touch panel 35 with the finger or the like to specify the normal BET area 41 or the side BET area 42 by using a cursor 47. At this state, touching the 1-BET button 43A with the finger or the like enables the player to BET one chip at a time (the number of BETs increases in order of 1, 2, 3, and so forth every time the 1-BET button 43A is touched with the finger or the like). Similarly, touching the 5-BET button 43B with the finger or the like enables the player to BET five chips at a time (the number of BETs increases in order of 5, 10, 15, and so forth every time the 5-BET button 43B is touched with the finger or the like). Touching the 10-BET button 43C with the finger or the like enables the player to BET ten chips at a time (the number of BETs increases in order of 10, 20, 30, and so forth every time the 10-BET button 43C is touched with the finger or the like). Touching the 100-BET button 43D with the finger or the like enables the player to BET one hundred chips at a time (the number of BETs increases in order of 100, 200, 300, and so forth every time the 100-BET button 43D is touched with the finger or the like). The number of BET chips up to the present moment is displayed as a chip mark 48, and a number displayed within the chip mark 48 shows the number of BETs of chips.

In a payback result display portion 45, the number of BETs of chips of the player and the number of payback credits in the previous game are displayed. A number obtained by subtracting the number of BETs from the number of payback credits indicates the number of credits newly acquired by the player in the previous game.

In the number-of-credits display portion 46, the number of credits owned by the player is displayed. This number of credits decreases according to the number of BETs (one credit per one chip) when chips are BET. Further, when the BET chips are won and credits are paid back, the number of credits increases by the number of the paid back credits. It is to be noted that, when the number of credits becomes 0, the game is ended.

Next, the normal BET areas 41 on the BET screen 40 are described.

The normal BET areas 41A, 41B are portions used when the player places a BET based on a prediction of the total value of the dice 70A to 70C. Namely, the normal BET area 41A is selected when the total value is predicted to be 4 to 10, and the normal BET area 41B is selected when the total value is predicted to be 11 to 17. The payout is set to 1:1 (two chips are paid out with respect to one BET).

The normal BET area 41C is a portion used when the player places a BET based on a prediction that the outcomes of two dice 70 out of the three dice 70 will be identical. Namely, the normal BET area 41C is used when the player places a BET based on a prediction that any of the combinations of the outcomes (1, 1), (2, 2), (3, 3), (4, 4), (5, 5) and (6, 6) will appear, out of the outcomes of the three dice 70; here, the payout is set to 1:10.

The normal BET area 41D is a portion used when the player places a BET based on a prediction that all the outcomes of the three dice 70 will be identical. Namely, the normal BET area 41D is used when the player places a BET based on a prediction that the outcomes of the three dice 70 will be any of (1, 1, 1), (2, 2, 2), (3, 3, 3), (4, 4, 4), (5, 5, 5) and (6, 6, 6). The payout is set to 1:30.

The normal BET area 41E is a portion used when the player places a BET based on a prediction that all the outcomes of the three dice 70 will be identical, and a prediction of the value that the three dice 70 will have. Namely, the normal BET area 41E is used when the player places a BET based on a prediction that the outcomes of the three dice 70 will be (1, 1, 1), (2, 2, 2), (3, 3, 3), (4, 4, 4), (5, 5, 5) or (6, 6, 6) and also a prediction of the value that the three dice 70 will have. The payout is set to 1:180.

The normal BET area 41F is a portion used when the player places a BET based on a prediction of the total value of the three dice 70. The payout is set according to an appearance probability of the total value: the payout is 1:60 when the total value is 4 or 17; 1:30 when the total value is 5 or 16; 1:18 when the total value is 6 or 15; 1:12 when the total value is 7 or 14;

1:8 when the total value is 8 or 13; 1:7 when the total value is 9 or 12; and 1:6 when the total value is 10 or 11.

The normal BET area 41G is a potion used when the player places a BET based on a prediction of the outcomes of two dice 70 out of the three dice 70. The payout is set to 1:5.

The normal BET area 41H is a portion used when the player places a BET based on a prediction of the outcome of at least one die 70 out of the dice 70, and the payout is set according to the number of the dice 70 with the outcome corresponding to the predicted outcome.

Figure 7:
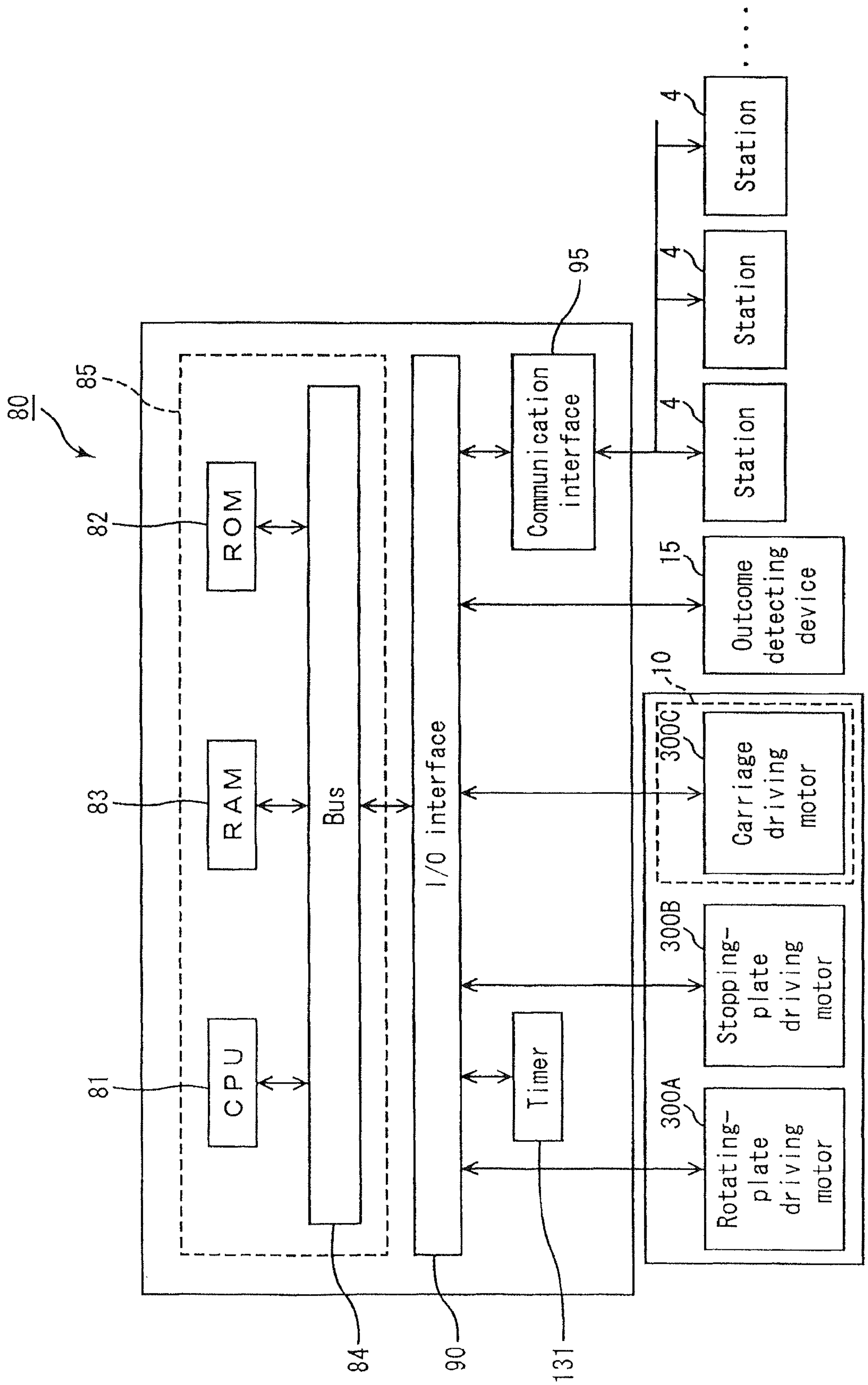
FIG. 7 is a block diagram showing an internal configuration of the gaming machine shown in FIG. 2.

FIG. 7 is a block diagram showing an internal configuration of a main control portion 80 in the gaming machine shown in FIG. 2.

The main control portion 80 of the gaming machine 1 has a microcomputer 85, which mainly comprises a CPU 81, a ROM 82, a RAM 83, and a bus 84 that transfers data mutually thereamong.

The CPU 81 is connected to the rotating-plate driving motor 300A, the stopping-plate driving motor 300B and the carriage driving motor 300C, through an I/O interface 90. Further, through the I/O interface 90, the CPU 81 is connected to a timer 131 capable of measuring time. The I/O interface 90 is also connected with the foregoing outcome detecting device 15, and transmits and receives information on the outcomes of the three dice 70 having stopped on the stopping plate 3*c*, and the like, to and from the outcome detecting device 15. Moreover, the I/O interface 90 is connected with a communication interface 95; through this communication interface 95, the main control portion 80 transmits and receives data such as BET information, and payout information, to and from each station 4.

The ROM 82 of the main control portion 80 stores programs for realizing a basic function of the gaming machine 1, specifically a program for controlling a variety of devices for driving the gaming portion 3, a program for controlling each station 4, and the like, and also stores a payout table, data showing predetermined time T, data showing a specific value TT, and the like.

The RAM 83 is a memory that temporarily stores a variety of data calculated in the CPU 81. For example, the RAM 83 temporarily stores BET information transmitted from each station 4, information on the outcomes of the dice 70 transmitted from the outcome detecting device 15, data on results of processing executed by the CPU 81, and the like.

The JACKPOT storage area is provided in the RAM 83.

In the JACKPOT storage area, data showing the number of cumulatively accumulated game media is stored in association with each of the identical numbers.

The data is supplied to the station 4 at a predetermined timing, and the JACKPOT image 101 is displayed based on the data.

Based on the data and programs stored in the ROM 82 and the RAM 83, the CPU 81 controls the rotating-plate driving motor 300A, the stopping-plate driving motor 300B and the carriage driving motor 300C which drive the gaming portion 3, throws the dice 70 onto the rotating plate 3*b* of the gaming portion 3, and performs some other operations. Further, the CPU 81 executes control processing associated with the proceeding of the game, such as processing of checking the outcome of each of the dice 70 having stopped on the stopping plate 3*c*.

In addition to the control processing associated with the proceeding of the game, the CPU 81 has the function of controlling each station 4 so as to make the game proceed, by transmitting and receiving data to and from each station 4. Specifically, the CPU 81 receives BET information transmitted from each station 4. Further, based on the outcomes of the dice 70 and the BET information transmitted from each station 4, the CPU 81 performs winning determination processing, to calculate an amount of payout to be paid out at each station 4 with reference to the payout table stored in the ROM 82.

Figure 8:
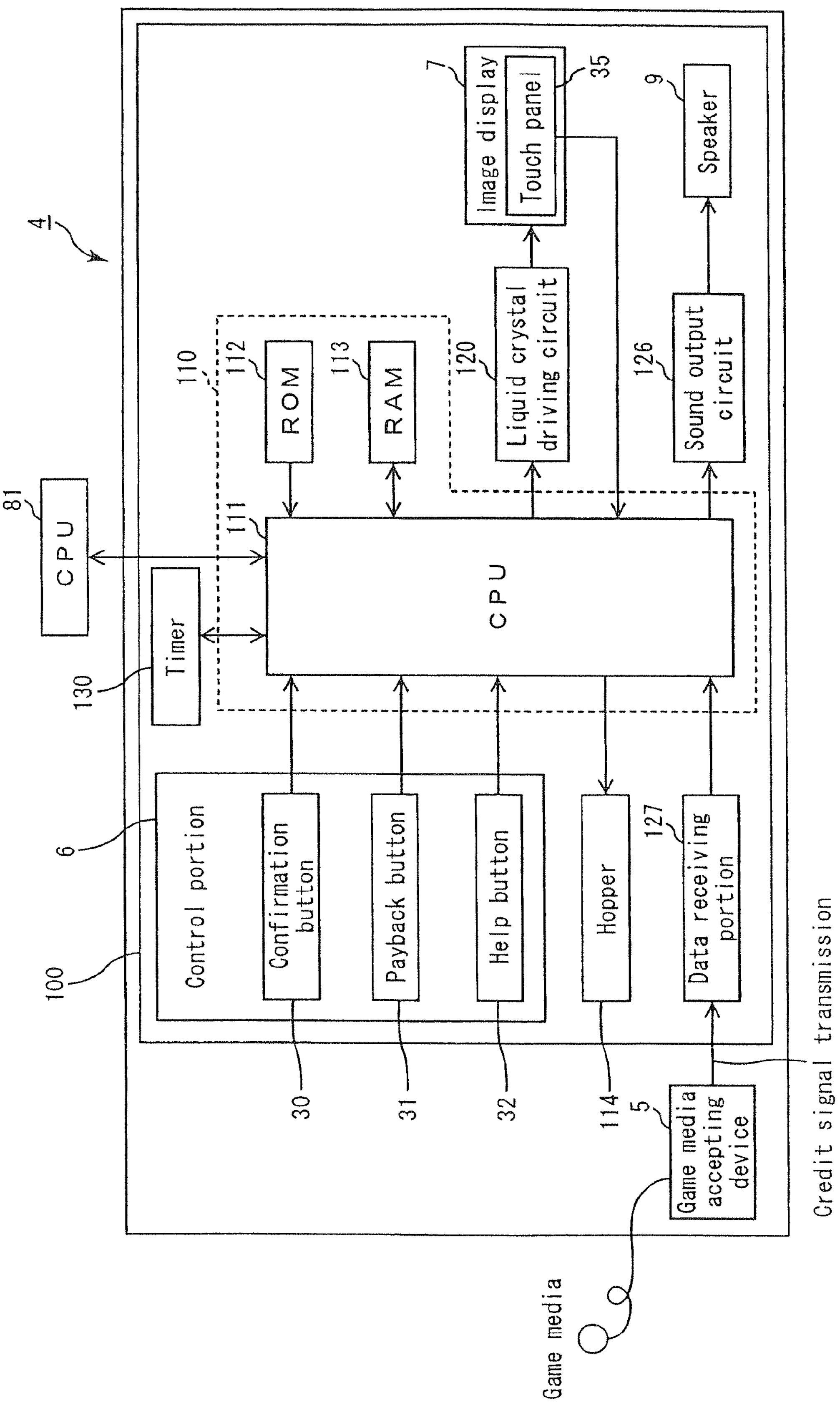
FIG. 8 is a block diagram showing an internal configuration of one of the stations shown in FIG. 2.

FIG. 8 is a block diagram showing an internal configuration of the station shown in FIG. 2.

The station 4 includes a main body portion 100 provided with the image display 7 and the like, and the game media accepting device 5 installed on the main body portion 100. Further, the main body portion 100 includes a station-controlling portion 110 and several peripheral devices.

The station-controlling portion 110 includes a CPU 111, a ROM 112, and a RAM 113.

The ROM 112 stores a program for realizing a basic function of the station 4, a variety of programs necessary for controlling the station 4, a data table, and the like.

The CPU 111 is connected separately with the confirmation button 30, the payback button 31, and the help button 32 which are provided in the control portion 6. Further, based on an operation signal output at the press of each button or the like, the CPU 111 performs control so as to execute a variety of operations corresponding to the signal. Specifically, the CPU 111 executes a variety of processing, based on an input signal that is supplied from the control portion 6 when the player has input an operation and on the data and programs stored in the ROM 112 and the RAM 113, and transmits the results of the processing to the CPU 81 of the main control portion 80.

Further, the CPU 111 receives a command signal from the CPU 81 of the main control portion 80, to control the peripheral devices constituting the station 4. Moreover, the CPU 111 executes a variety of processing, based on input signals supplied from the control portion 6 and the touch panel 35 and on the data and programs stored in the ROM 112 and the RAM 113. Based on the results of the processing, the CPU 111 controls the peripheral devices constituting the station 4. It is to be noted that which method is to be applied in performing the processing is set for each processing according to the content of the processing. For example, the processing of paying out game media corresponds to the former, and the BET operation processing by the player corresponds to the latter.

The CPU 111 is connected with a hopper 114, and the hopper 114 pays out a predetermined number of game media from the payout exit 8 based on a command signal from the CPU 111.

The CPU 111 is connected with the image display 7 through a liquid crystal driving circuit 120. The liquid crystal driving circuit 120 includes a program ROM, an image ROM, an image control CPU, a work RAM, a VDP (video display processor), a video RAM, and the like. The program ROM stores an image control program regarding display to the image display 7 and a variety of selection tables. The image ROM stores, for example, dot data for forming an image displayed to the image display 7, and dot data for displaying the JACKPOT image 101. Further, based on parameters set in the CPU 111, the image control CPU determines an image to be displayed to the image display 7 out of the dot data previously stored inside the image ROM, according to the image control program previously stored inside the program ROM. Moreover, the work RAM is configured as a temporary storage device in execution of the image control program in the image control CPU. Furthers the VDP forms an image according to the display contents determined by the image control CPU, and outputs the image to the image display 7. It is to be noted that the video RAM is configured as a temporary storage device in formation of an image by the VDP.

The touch panel 35 is installed on the front surface of the image display 7, as described above, and information on the operation of the touch panel 35 is transmitted to the CPU 111. The touch panel 35 detects an input operation performed by the player on the BET screen 40 and the like. Specifically, selection of the normal BET areas 41 of the BET screen 40 and the side BET area 42, input using the unit BET buttons 43 and the like are performed by the operation of touching the touch panel 35, and the information of the operation is transmitted to the CPU 111. Based on the information, BET information of the player is stored in the RAM 113. Further, the BET information is transmitted to the CPU 81 of the main control portion 80, and stored in the BET information storage area in the RAM 83.

Further, the sound output circuit 126 and the speakers 9 are connected to the CPU 111, and the speakers 9 generate a variety of effect sounds when a variety of effects are produced based on output signals from the sound output circuit 126. Moreover, the CPU 111 is connected with the game media accepting device 5 functioning as a device into which game media such as medals or currency are inserted through a data receiving portion 127. The data receiving portion 127 receives a credit signal transmitted from the game media accepting device 5, and the CPU 111 increases the number of credits of the player stored in the RAM 113 based on the transmitted credit signal.

The CPU 111 is connected with a timer 130 capable of measuring time.

Subsequently, processing executed in the gaming machine according to the present embodiment is described using FIGS. 9 to 10.

First, processing performed in the main control portion is described.

Figure 9A:
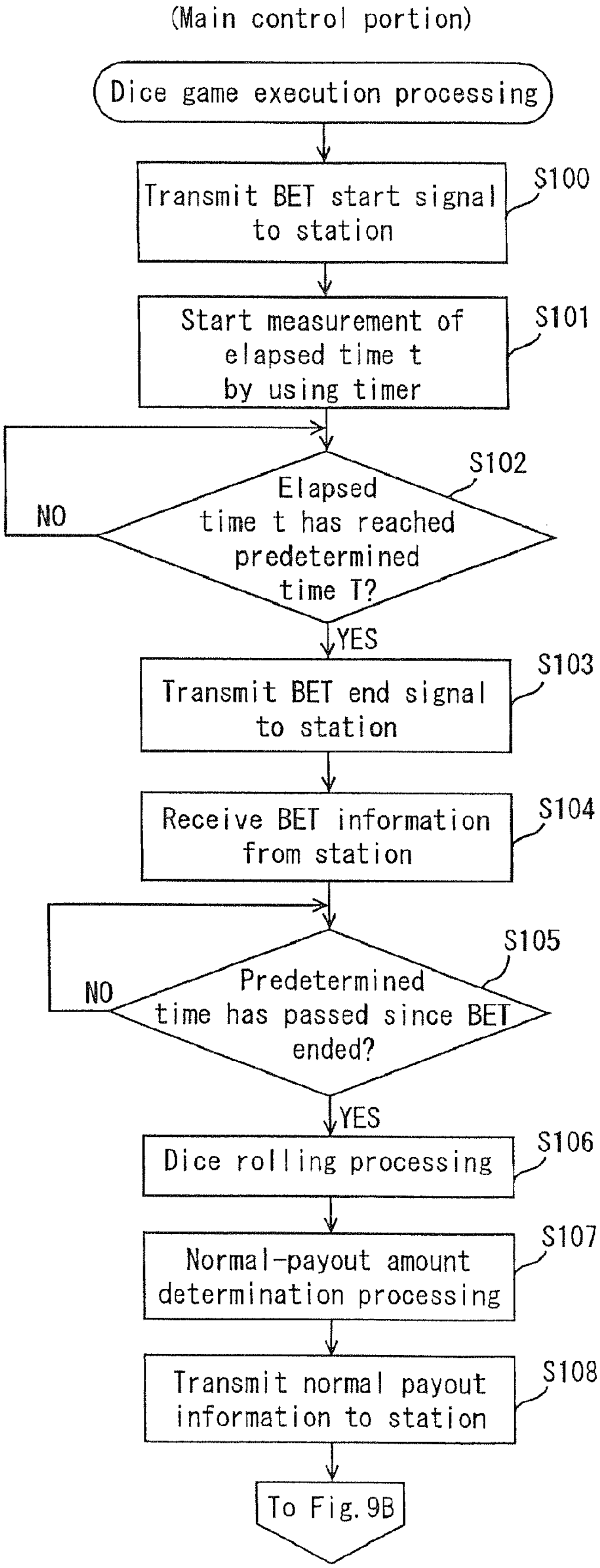
FIG. 9A is a flowchart showing a subroutine of dice game execution processing that is performed in a main control portion.
Figure 9B:
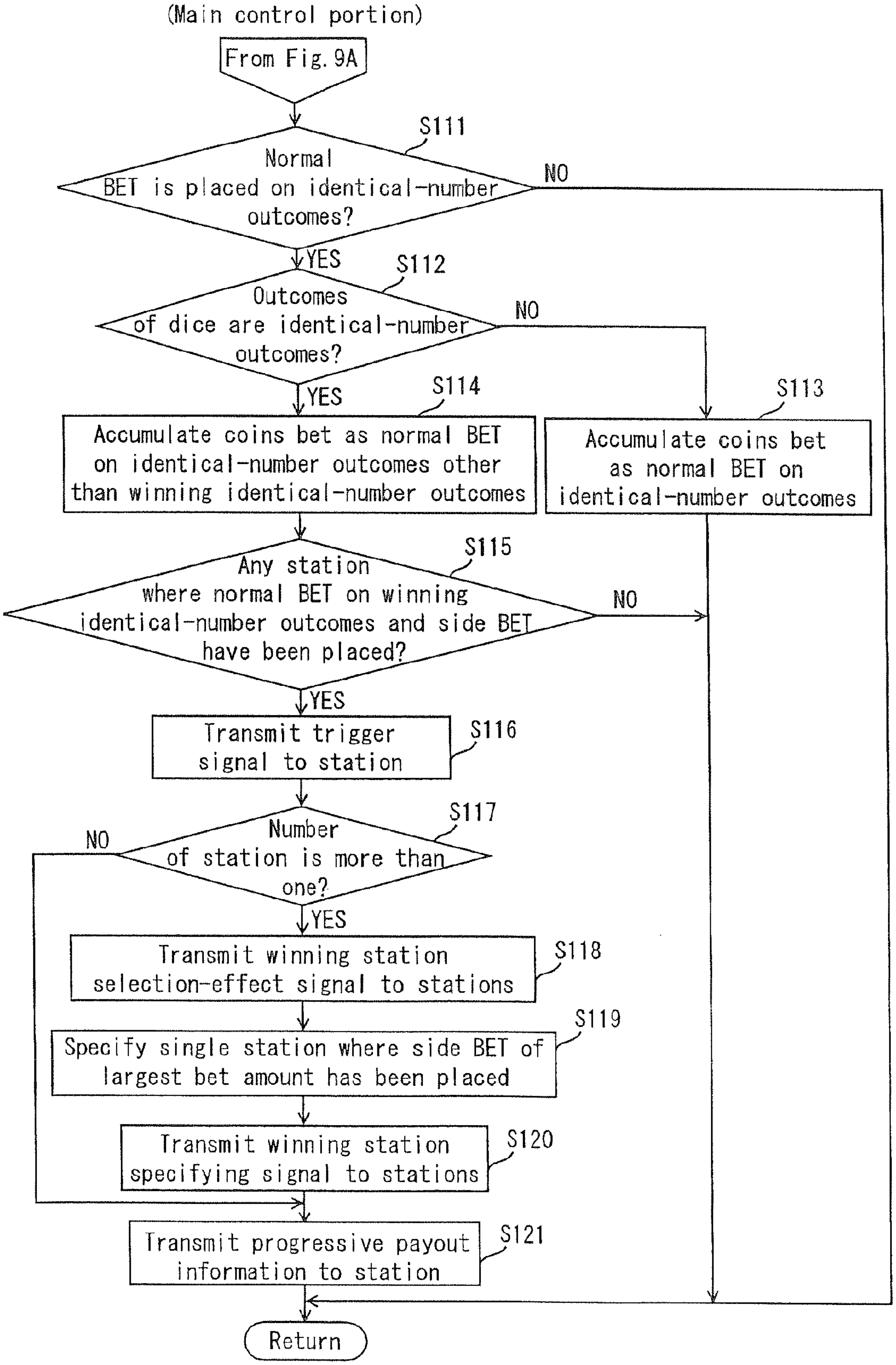
FIG. 9B is a flowchart showing a subroutine of dice game execution processing that is performed in a main control portion.

FIGS. 9A and 9B are flowcharts showing a subroutine of dice game execution processing that is performed in the main control portion.

In step S100, first the CPU 81 transmits a BET start signal to each station 4.

In step S101, the CPU 81 starts measurement of elapsed time t by using the timer 131. Next, the CPU 81 compares the elapsed time t measured by the timer 131 with data indicating predetermined time T stored in the ROM 82, and then determines whether or not the elapsed time t measured by the timer 131 has reached the predetermined time T (step S102).

When determining in step S102 that the elapsed time t has not reached the predetermined time T, the CPU 81 returns the processing to step S102. On the other hand, when determining in step S102 that the elapsed time t has reached the predetermined time T, the CPU 81 transmits a BET end signal to each station 4 (step S103).

The CPU 81 then receives BET information from each station 4 (step S104). The BET information is information on the normal BET input and the side BET input which were made in each station 4.

After completion of betting in each station 4, the CPU 81 determines whether or not predetermined time (TT) has elapsed (step S105). In this processing, the CPU 81 determines whether or not the difference between the elapsed time t measured by the timer 131 and the predetermined time T stored in the ROM 82 has become a specific value TT stored in the ROM 82. More specifically, the CPU 81 first subtracts the predetermined time T stored in the ROM 82 from the elapsed time t measured by the timer 131. The CPU 81 further compares the numeric value obtained by the subtraction with the specific value TT stored in the ROM 82, and determines whether or not the numeric value obtained by the subtraction has become the specific value TT stored in the ROM 82. By appropriately setting data showing the specific value TT, setting can be made such that processing of rolling the dice 70 can be performed at a desired timing.

When determining in step S105 that the predetermined time (TT) has not elapsed after completion of betting in each station 4, the CPU 81 returns the processing to step S105. On the other hand, when determining in step S105 that the predetermined time (TT) has elapsed after completion of betting in each station 4, the CPU shifts the processing to step S106.

The CPU 81 executes processing of rolling the dice 70 in step S106. In the processing, based on the data and programs stored in the ROM 82 and the RAM 83, the CPU 81 controls the rotating-plate driving motor 300A, the stopping-plate driving motor 300B and the carriage driving motor 300C so as to perform control of throwing in the dice 70, control of rolling the dice 70, control of stopping the dice 70, and the like. Further, the CPU 81 executes control processing associated with the proceeding of the game, such as processing of checking the outcome of each of the dice 70 having stopped on the stopping plate 3*c* and the like.

When the CPU 81, the ROM 82 and the RAM 83 operate together to execute the processing in step S106, the CPU 81, the ROM 82 and the RAM 83 function as the controller that executes the processing (B) in the present invention. Further, step S106 corresponds to the step (B) in the present invention.

In step S107, the CPU 81 executes normal-payout amount determination processing. In the processing, the CPU 81 executes winning determination processing, based on the information on the outcomes of the dice 70 having stopped on the stopping plate 3*c* and the BET information received from each station 4. The CPU 81 then calculates an amount of game media (normal payout amount) to be paid out at each station 4 with reference to the payout table stored in the ROM 82.

Next, the CPU 81 transmits to each station 4 normal payout information showing a normal payout amount in each station 4 (step S108).

Subsequently, based on the BET information received from each of the stations 4 in step S104, the CPU 81 determines whether or not the normal BET has been placed on any of the identical numbers (step S111). When the CPU determines that the normal BET was not placed on any of the identical numbers, the CPU81 completes the present subroutine.

Meanwhile, when the CPU 81 determines that the normal BET has been placed on any of the identical numbers, then the CPU determines whether or not the outcomes of the dice are identical-number outcomes (step S112) based on information on the outcomes of the dice 70 stopped on the stopping plate 3*c*.

When the CPU 81 determines that the outcomes of the dice are not identical, the number of game media bet as the normal BET on each of the identical numbers is stored by the CPU in the JACKPOT storage area of the RAM 83 (step S113) in association with the identical number on which the normal BET has been placed. Thereafter, the CPU 81 completes the present subroutine.

On the other hand, when the CPU determines that all the outcomes of the dice are identical, the number of game media bet as the normal BET on identical-number outcomes other than the above-mentioned identical outcomes (winning identical-number outcomes) is stored by the CPU in the JACKPOT storage area of the RAM 83 in association with the identical-number outcomes on which the normal BET has been placed (step S114).

When the CPU 81, the ROM 82 and the RAM 83 operate together to execute processing of the step S113 and the step 114, the CPU 81, the ROM 82, and the RAM 83 function as the controller to execute processing (C) in the present invention. Moreover, the step S113 and the step S114 constitute the step (C) in the present invention.

Next, the CPU 81 determines whether or not there is any station 4 where the normal BET has been placed on the winning identical-number outcomes and further the side BET has been placed (step S115), based on the BET information received from each of the stations 4 in step S104.

In the case the CPU 81 determines that there is no station 4 where the normal BET has been placed on the winning identical-number outcomes and further the side BET has been placed, the CPU completes the present subroutine.

On the other hand, in the case where the CPU 81 determines that there is the station 4 where the normal BET has been placed on any of the winning identical-number outcomes and further the side BET has been placed, the CPU transmits a trigger signal to the relevant station 4 (step S116). The trigger signal is a signal that triggers execution of processing for offering the progressive JACKPOT payout in the station 4.

Next, the CPU 81 determines whether or not there is more than one station 4 where the normal BET has been placed on the winning identical-number outcomes and further the side BET has been placed (step S117).

In the case where the CPU determines that there are a plurality of the stations 4 where the normal BET has been placed on the winning identical-number outcomes and further the side BET has been placed, the CPU 81 transmits a winning station selection-effect signal to those stations 4 (step S118). The winning station selection-effect signal is a signal that triggers execution of an effect (see FIGS. 1C and 1D) performed upon determination of one of the stations 4 among the plurality of the stations 4 where the normal BET has been placed on the wining identical number and further the side BET has been placed, as the station to which the progressive JACKPOT payout is to be offered.

Next, the CPU 81 identifies a single station 4 (step S119) where the largest number of game media have been bet as the side BET, based on the BET information received from each of the stations 4 in step S104, among the plurality of the stations 4 where the normal BET has been placed on the winning identical-number outcomes and further the side BET has been placed. Here, if there is more than one station 4 where the side BET has been placed with the largest number of game media, the CPU 81 specifies one of the stations 4 by means of a random number.

Thereafter, the CPU transmits a winning station specifying signal to the stations 4 to which the winning station selection-effect signal has been transmit (step S120). The winning station specifying signal is a signal that triggers display of an image showing that the single station 4 to which the progressive JACKPOT payout is to be offered is decided (see FIG. 1D) on the image display 7.

When the CPU 81 determines that there is a single station 4 where the normal BET has been placed on the winning identical-number outcomes and further the side BET has been placed in step S117, the CPU 81 transmits to the single station 4 a progressive JACKPOT payout information (step S121).

On the other hand, after executing the processing of step S120, the CPU 81 transmits the progressive JACKPOT payout information to the single station 4 identified in step S119 (step S121).

The progressive JACKPOT payout information is information indicating the number of game media to be offered as the progressive JACKPOT payout. Also, the progressive JACKPOT payout information is information indicating the number of game media stored in the JACKPOT storage area of the RAM 83 in association with the identical-number outcomes indicated by the information on the outcomes of the dice 70 stopped on the stopping plate 3*c*.

After execution of step S121, the CPU complete the present subroutine.

In the above, the processing performed in the main control portion 80 was described.

Next, the processing performed in the station 4 is described.

Figure 10A:
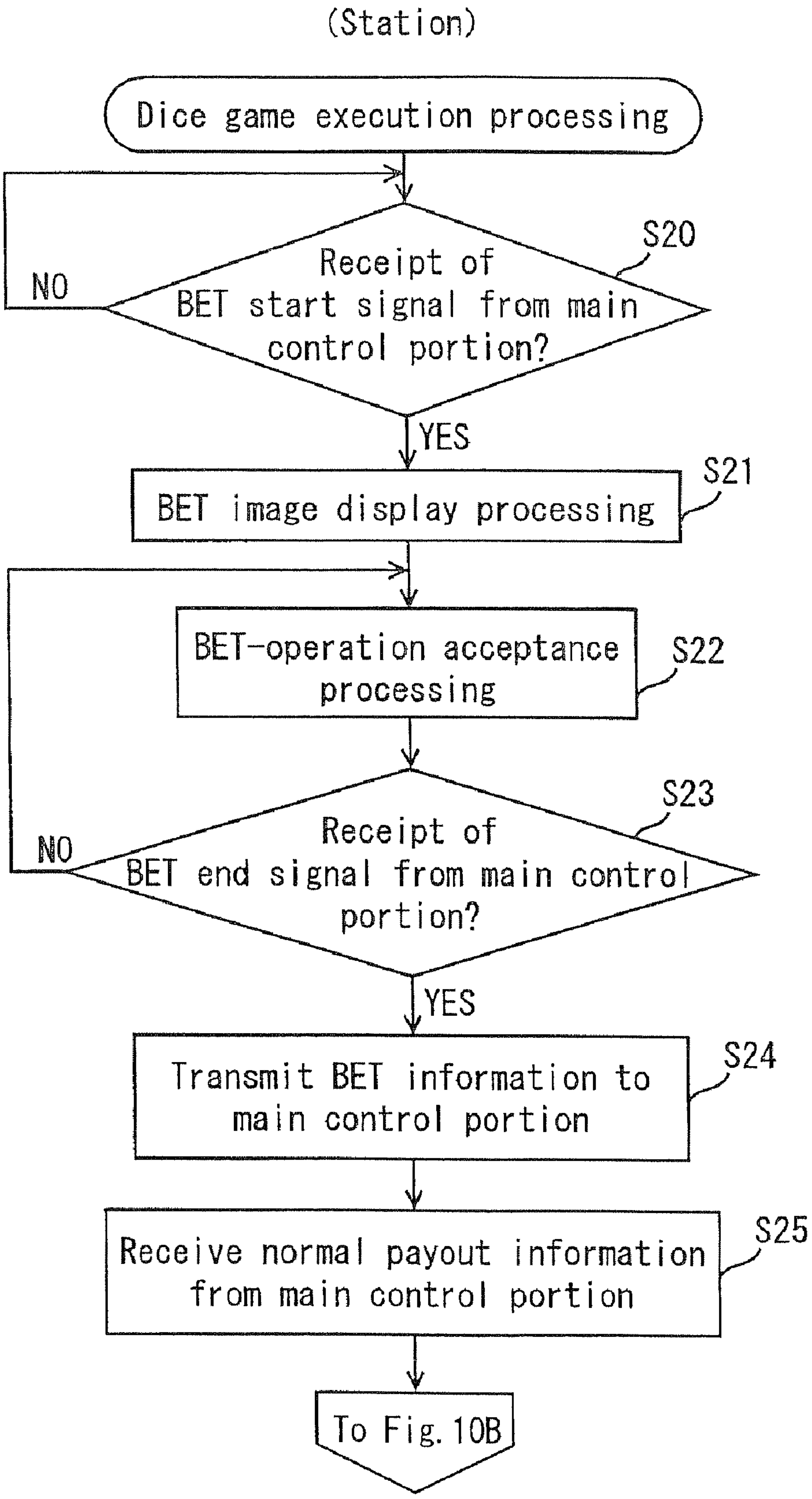
FIG. 10A is a flowchart showing a subroutine of dice game execution processing that is performed in the station.
Figure 10B:
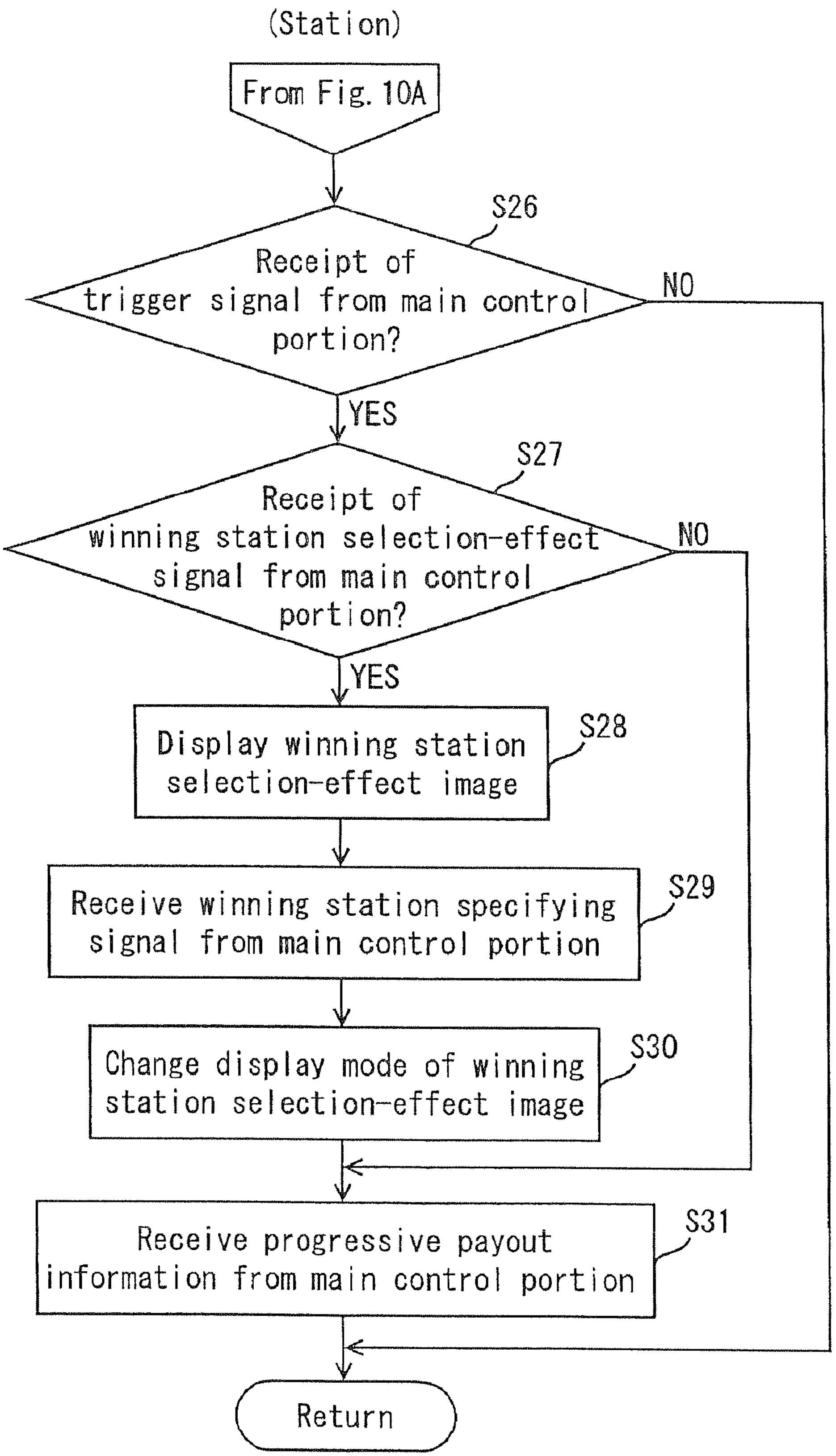
FIG. 10B is a flowchart showing a subroutine of dice game execution processing that is performed in the station.

FIGS. 10A and 10B are flowcharts each showing a subroutine of dice game execution processing that is performed in the station.

First, in step S20, the CPU 111 determines whether or not a BET start signal has been received from the main control portion 80. When determining that the BET start signal has not been received, the CPU 111 returns the processing to step S20. On the other hand, when determining that the BET start signal has been received, the CPU 111 shifts the processing to step S21.

The CPU 111 executes BET-image display processing in step S21. In the processing, the CPU 111 displays the BET screen 40 shown in FIG. 6 to the image display 7.

The CPU 111 executes BET-operation acceptance processing in step S22. In the processing, the CPU 111 accepts a normal BET input and a side BET input by the player through the touch panel 35. Further, in this processing, the CPU 111 makes the RAM 113 store information on the side BET input as the side BET information.

When the CPU 111, the ROM 112 and the RAM 113 operate together to execute the processing in step S22, the CPU 111, the ROM 112 and the RAM 113 function as the controller that executes the processing (A) and (A') in the present invention. Further, step S22 corresponds to the step (A) in the present invention.

Next, the CPU 111 determines whether or not a BET end signal has been received from the main control portion 80 (step S23). When determining that the BET end signal has not been received, the CPU 111 returns the processing to step S22. On the other hand, when determining that the BET end signal has been received, the CPU 111 shifts the processing to step S24.

The CPU 111 transmits the BET information to the main control portion 80 in step S24. In the processing, the CPU 111 transmits to the main control portion 80 information regarding the normal BET input and the side BET input, the information having been accepted in step S22, as BET information. It is to be noted that the BET information includes the identification number of the station 4.

Next, the CPU 111 receives the normal payout information from the main control portion 80 (step S25).

Subsequently, the CPU 111 determines whether or not the trigger signal (see step S116 in FIG. 9B) has been received from the main control portion 80 (step S26).

When determining that the trigger signal has not been received, the CPU 111 completes the present subroutine.

On the other hand, when determining that the trigger signal has been received, the CPU 111 determines (step S27) whether or not the winning station selection-effect signal has been received from the main control portion 80 (see step S118 in FIG. 9B).

When the CPU 111 determines that the winning station selection-effect signal has been received, a winning station selection-effect image is displayed by the CPU 111 to the image display 7 (step S28). The winning station selection-effect image consists of the player images 110A to 110J corresponding to the ten stations 4 (see FIG. 1C). In the winning station selection-effect image, the player image corresponding to the station 4 where the normal BET has been placed on the winning identical-number outcomes and further the side BET has been placed is brightly displayed, whereas the player images corresponding to other stations 4 are darkly displayed. Meanwhile, the winning station selection-effect signal includes information indicating the station 4 where the normal BET has been placed on the winning identical-number outcomes and further the side BET has placed.

Next, the CPU 111 receives the winning station specifying signal (see step S120 in FIG. 9B) from the main control portion 80 (step S29). The winning station specifying signal includes information indicating the single station 4 to which the progressive JACKPOT payout is offered.

Then, based on the information indicating the single station 4 to which the progressive JACKPOT payout is offered, the information being included in the winning station specifying signal, the CPU 111 changes the display mode of the winning station selection-effect image (step S30) so as to indicate that the player who is playing the game at the single station 4 is able to receive the progressive JACKPOT payout. Specifically, the CPU 111 displays the player images corresponding to the stations 4 except for the single station 4 to which the progressive JACKPOT payout is to be offered in dark mode, while displays the character image 111 "WINNER!" at the upper portion of the player image corresponding to the single station 4 to which the progressive JACKPOT payout is to be offered.

Next, the CPU 111 of the station 4 to which the progressive JACKPOT is determined to be offered receives the progressive JACKPOT payout information (see step S121 in FIG. 9B) from the main control portion 80 (step S31). Thereafter, the CPU 111 executes processing of offering game media in an amount corresponding to the normal payout amount indicated by the normal payout information received in step S25 and game media in the number indicated by the progressive JACKPOT payout information received in step S31.

When the CPU 111, the ROM 112, and the RAM 113 operate together to execute the above-mentioned processing, the CPU 111, the ROM 112, and the RAM 113 function as the controller to execute processing (D) in the present invention. Moreover, the step relating to the payout corresponds to the step (D) in the present invention.

Further, the CPU 111 in each of the stations 4 other than the above-mentioned single station 4 executes processing relating to payout of the game media in an amount corresponding to the normal payout amount indicated by the normal payout information received in step 25.

Specifically, the CPU 111 updates the number of credits of the player stored in the RAM 113, and also updates display on the refund result display portion 45 and the number-of-credits display portion 46.

Thereafter, the CPU 111 completes the present subroutine.

The present embodiment has been described in the above.

In the present embodiment, the progressive JACKPOT payout is offered when all the outcomes of the dice are identical numbers. In addition, the game media bet as the normal BET on any of the identical numbers are cumulatively accumulated. However, the plural kinds of the predetermined conditions in the present invention are not limited to the outcomes of the dice "being all identical." For example, the plural kinds of the predetermined conditions in the present invention may include a status in that all the outcomes of the plurality of dice are even numbers (or odd numbers). Moreover, the plural kinds of the predetermined conditions in the present invention may include a status in that the outcomes of the plurality of dice are (N, N+1, N+2) (N is a positive integer). Further, the plural kinds of the predetermined conditions in the present invention may include a status in that a total value of the outcomes of the plurality of dice is a specific number.

Furthermore, when the identical-number outcomes of (N, N, . . . , N) (N is a positive integer) are employed for the plural kinds of the predetermined conditions, the game media bet as the normal BET on the (N, N, . . . , M) (M and N may be the identical number or different numbers) may be cumulatively accumulated.

Furthermore, in the present embodiment, the single station 4 to which the progressive JACKPOT payout is offered has been described as the station 4 where the largest number of game media have been bet as the side BET. However, in the present invention, the station 4 to which the progressive JACKPOT payout is offered may be the station 4 where the largest number of game media have been bet as the normal BET.

Moreover, with regard to the progressive JACKPOT payout, all of the cumulatively accumulated game media are not necessarily offered. In this case, the amount of game media to be offered for the progressive JACKPOT payout may be varied based on the amount of game media bet as the normal BET or as the side BET.

Also, the amount of game media to be offered in each of the stations may be proportionally divided based on the amount of game media bet as the normal BET or the side BET.

The dice used in the gaming machine of the present invention may have an irregular shape. In that case, it becomes possible to make players enjoy presuming which outcomes of the dice tend to appear based on differences in the amounts of the game media accumulated in association with each of the outcomes of the dice satisfying a predetermined condition.

According to the gaming machine 1 of the present embodiment, the cumulatively accumulated game media are offered when all the outcomes of the dice are identical. Therefore, when all the outcomes of the dice are identical, the player has a chance to obtain a large number of game media. This can make the player play the game with a sense of expectation that the outcomes of the dice may be identical. As a result, it is possible to provide a game in which the player hardly feels bored even when the game is played for a long period of time.

In general, a payout offered in a dice game is limited to such payout that is offered when a normal BET has been placed on outcomes of dice and then the outcomes of the dice become identical with the bet outcomes of the dice (i.e., payout due to winning of the normal BET). On the other hand, according to the gaming machine 1 of the present invention, offering of a payout due to establishment of the identical-number outcomes is performed separately from offering of a payout due to winning of a normal BET. As a result, payout modes can be varied, and therefore interest of the player in the payout can be increased.

Moreover, according to the gaming machine 1 of the present embodiment, the source of game media to be offered when all the outcomes of the dice are identical is the game media bet as the normal BET on identical-number outcomes.

Since the outcomes of dice to be the condition for offering of a payout correlates with the outcomes of dice relating to the source of the payout as mentioned above, it is possible to make the player surely aware that offering of a payout is performed due to the establishment of the identical-number outcomes. This aspect can provide the player with satisfaction.

According to the gaming machine 1 of the present embodiment, the number of game media cumulatively accumulated in association with identical-number outcomes that have not been won for a long period of time can be very large. This aspect can make the player have an expectation for the payout of the game media cumulatively accumulated in association with such identical numbers. Accordingly, it is possible to provide a game in which the player hardly feels bored even when the game is played for a long period of time.

Moreover, according to the gaming machine 1 of the present embodiment, the cumulatively accumulated game media are offered when all the outcomes of the dice are identical. Since the chance of the outcomes of the dice being identical is slim, the player normally has a kind of thrilling feeling when all the outcomes of the dice become identical. According to the gaming machine 1 of the present invention, the cumulatively accumulated game media are offered upon establishment of an identical-number outcome, which has the special meaning for the player. Therefore, it is possible to drastically enhance sensation of the player.

Further, according to the gaming machine 1 of the present embodiment, the cumulatively accumulated game media are offered based on the amount of game media bet as the side BET. Therefore, a larger amount of game media bet as the side BET may increase the chance of receiving payout of the cumulatively accumulated game media. Accordingly, it is possible to prompt the player to place the side BET with a larger amount of game media, with the result that profit of the amusement parlor can be increased.

Furthermore, according to the gaming machine 1 of the present embodiment, the cumulatively accumulated game media are offered when the outcomes of the dice are identical-number outcomes and also a normal BET has been placed on the relevant outcomes of the dice (i.e. when the normal BET wins). Thus, since payout of game media resulting from the winning of the normal BET and payout of the cumulatively accumulated game media are simultaneously offered, the satisfaction of the player can be increased.

Still furthermore, according to the gaming machine 1 of the present embodiment, when all the outcomes of the dice are identical and also there are a plurality of the stations 4 each provided with the touch panel 35 from which input of the normal BET on the relevant outcomes of the dice has been made, the cumulatively accumulated game media are offered based on the amount of game media bet as the side BET. Namely, in a case where there are a plurality of the players who are candidates to receive offering of the cumulatively accumulated game media, the decision as to which player is provided with the cumulatively accumulated game media is made based on the amount of game media bet as the side BET by each of the plurality of the players.

Therefore, the side BET of a larger amount of game media may result in a higher chance of receiving the offering of the cumulatively accumulated game media. Accordingly, it is possible to prompt the player to place the side BET with a larger amount of game media, with the result that profit of the amusement parlor can be increased.

Additionally, according to the gaming machine 1 of the present embodiment, it is possible to place two types of BETs, which are a normal BET and a side BET. Further, placement of the side BET is necessary in order to be offered the cumulatively accumulated game media. Thus, it becomes possible to make the player think about game strategies such as how to best increase the game media by using the limited game media on hand (e.g. to which a larger amount of game media should be spent, for the normal BET or for the side BET?), or the like. As a result, it becomes possible to enhance interesting aspects of the game so that it is possible to provide a game in which the player hardly feels bored even when the game is played for a long period of time.

Although the case has been described in the present embodiment where the real dice 70 roll in the gaming portion 3, a configuration may be employed in the present invention in which a main image display is installed separately from the image display provided in the station and an image showing the dice in a state of rolling is displayed to the main image display, without using real dice.

In this case, the CPU 81 is connected, through the I/O interface 90, with a random number generator 130B and a liquid crystal driving circuit 120B equivalent to the liquid crystal driving circuit 120 provided in the station 4. Further, the CPU 81 is connected with a main image display 701 through the liquid crystal driving circuit 120B.

The CPU 81 determines the outcome of each of the dice 70 by means of a random number. The CPU then displays an image showing the state of rolling of the dice 70 to the main image display 701. The CPU 81 further displays an image showing the dice 70 in a state of stopping with the outcomes of the determined value to the main image display 701.

Although the embodiment of the present invention in which the real dice 70 rotate in the gaming portion 3 has been described in the above, the present invention may also include a configuration in which the real dice are not used but an image showing dice in a state of rolling is displayed to the image display in the station.

In this case, the CPU is connected to the random number generator 130B through the I/O interface 90.

The CPU 81 determines the outcome of each of the dice 70 by means of a random number, and transmits information on the determined value of the outcome of each of the dice 70 to each station 4. Each station 4 then displays an image showing the dice 70 in a state of rolling to the image display 7. Further, an image showing the dice 70 in a state of stopping is displayed to the image display 7 based upon the received information on the value of the outcome of each of the dice 70.

Although the case has been described in the present embodiment where the image display is not installed in any place other than the station 4, a configuration may be employed in the present invention in which the main image display is installed in the gaming machine separately from the image display provided in the station and an image showing the state of rolling of the dice in the gaming portion is displayed to the main image display.

In this case, the CPU 81 is connected, through the I/O interface 90, with a dice photographing device having a CCD camera 17B and the liquid crystal driving circuit 120B equivalent to the liquid crystal driving circuit 120 provided in the station 4. Further, the CPU 81 is connected with the dice photographing device through the liquid crystal driving circuit 120B. The CCD camera 17B provided in the dice photographing device is installed at an angle that allows photographing of the gaming portion 3.

The CPU 81 displays an image showing the state of rolling of the dice 70 in the gaming portion 3 to the main image display 701, based on the signal transmitted from the dice photographing device.

Although the case was described in the present embodiment where the image of the dice 70 is not displayed to the image display 7 in the station 4, the present invention may also include a configuration in which an image showing the dice in a state of rolling in the gaming portion is displayed to the image display in the station.

In this case, the CPU 81 is connected to the dice photographing device equipped with a CCD camera 17B through the I/O interface 90. The CCD camera 17B in the dice photographing device is installed at such an angle as to be able to photograph the gaming portion 3.

The CPU 81 transmits a signal transmitted from the dice photographing device to each station. The CPU 111 th end is plays to the image display 7 an image showing the dice 70 in a state of rolling in the gaming portion 3 based upon the signal received from the main control portion 80.

Although the case has been described in the present embodiment where the outcomes of the dice 70 are detected using the CCD camera 17, the method for detecting the outcomes of the dice is not particularly limited in the present invention. For example, an identifiable device, such as a device reactive to magnetism, may be previously imbedded inside each of the dice, and its outcome may be detected by the use of a magnetic change in the device. Moreover, an optical sensor may be used to detect the outcomes of the dice.

Although the case has been described in the present embodiment where the dice 70 are rolled using the rotating-plate driving motor 300A, the stopping-plate driving motor 300B and the carriage driving motor 300C, the method for rolling the dice is not particularly limited; for example, a configuration may be employed in which the dice are rolled on a vibration plate. Further, the dice may not be collected, but may be in a constantly exposed state inside the gaming portion.

Although the case was described in the present embodiment where the number of the dice 70 is three, the number of die is not restricted in the present invention, and for example, the number of die may be five.

Although the case has been described in the present embodiment where the controller in the present invention includes the CPU 81 provided in the main control portion 80 and the CPU 111 provided in the station 4, the controller in the present invention may be configured by a single CPU.

Although the present invention has been described with reference to embodiments thereof, these embodiments merely illustrate specific examples, not restrict the present invention. The specific structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there has been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming machine, comprising:

a gaming portion in which a plurality of dice roll and stop;

an input device with which a player can place a normal bet on outcomes of dice; and a controller, said controller programmed to execute the processing of (A) accepting from said input device an input indicating placement of a normal bet of game media on said outcomes of the dice, (B) rolling and stopping said plurality of dice in said gaming portion, (C) cumulatively accumulating and storing, in a case where the normal bet has not been placed on the outcomes of the dice satisfying a predetermined condition in said processing (A), or in a case where the outcomes of the plurality of dice stopped in said processing (B) do not satisfy the predetermined condition, a predetermined ratio of the game media which have been bet as the normal bet in said processing (A) in association with respective outcomes of the dice satisfying the predetermined condition, and (D) offering the game media, irrespective of the game media cumulatively stored in (C), when the outcomes of the plurality of dice stopped in (B) are identical to the outcomes of the dice bet as the normal bet in (A); and, (E) offering the game media cumulatively stored in (C) and associated with the outcomes of the dice stopped in (B) satisfying the predetermined condition, when the outcomes of the plurality of dice stopped in (B) satisfy the predetermined condition.

2. The gaming machine according to claim 1, wherein said predetermined condition is that all the outcomes of each of the dice are the same, said processing (C) is a processing of cumulatively accumulating and storing, in a case where no input indicating placement of the normal bet has been made on the outcomes of the dice in which all the outcomes of each of the dice are the same in said processing (A), or in a case where at least one of the outcomes of the dice is different from the other outcomes of the dice among the plurality of dice stopped in said processing (B), a predetermined ratio of the game media which have been bet as the normal bet in said processing (A), in association with respective outcomes of the dice in which all the outcomes of each of the dice are the same, and said processing (E) is processing of offering, in a case where all the outcomes of each of the plurality of dice stopped in processing (B) are the same, the game media cumulatively accumulated and stored in association with said same outcomes of the dice in processing (C).

3. The gaming machine according to claim 1, wherein said processing (C) is processing of cumulatively accumulating and storing, in a case where the input indicating placement of the normal bet on the outcomes of dice satisfying the predetermined condition has been made in said processing (A), and also the outcomes of the plurality of dice stopped in said processing (B) are different from the outcomes of the dice on which the normal bet has been placed, the game media bet as the normal bet on the outcomes of the dice, in association with the bet outcomes of the dice.

4. The gaming machine according to claim 1, wherein said processing (E) is processing of offering, in a case where the outcomes of the plurality of dice stopped in said processing (B) satisfy the predetermined condition, the game media cumulatively accumulated and stored in association with said outcomes of the plurality of dice in said processing (C) based on the amount of the game media which have been bet as the normal bet in said processing (A).

5. The gaming machine according to claim 1, wherein said processing (E) is processing of offering, in a case where the outcomes of the plurality of dice stopped in said processing (B) satisfy the predetermined condition, and also an input indicating placement of the normal bet on said outcomes of the plurality of dice has been made in said processing (A), the game media cumulatively accumulated and stored in association with said outcomes of the plurality of dice in said processing (C).

6. The gaming machine according to claim 5, wherein each of a plurality of stations is provided with an input device, said processing (A) is processing of accepting, from said input device provided at each of the stations, an input indicating placement of the normal bet of game media on outcomes of the dice, and said processing (E) is processing of offering, in a case where the outcomes of the plurality of dice stopped in said processing (B) satisfy the predetermined condition, and also there are a plurality of the stations each provided with the input device from which the input of the normal bet on said outcomes of the plurality of dice has been made in said processing (A), the game media cumulatively accumulated and stored in association with said outcomes of the plurality of dice in said processing (C) based on the amount of the game media which have been bet as the normal bet from the input device provided at each of the stations.

7. The gaming machine according to claim 1, wherein said input device is capable of placing a side bet different from said normal bet, said controller is programmed to further execute processing (A') of accepting an input indicating placement of the side bet of game media from the input device, said processing (C) is processing of cumulatively accumulating and storing a predetermined ratio of the game media which have been bet as the normal bet in said processing (A) and/or a predetermined ratio of the game media which have been bet as the side bet in said processing (A'), in association with the respective outcomes of the dice satisfying the predetermined condition, in a case where any normal bet has not been placed on the outcomes the dice satisfying the predetermined condition, or the outcomes of the plurality of dice stopped in said processing (B) do not satisfy conditions the predetermined condition, and said processing (E) is processing of offering, in a case where the outcomes of the plurality of dice stopped in said processing (B) satisfy the predetermined condition, the game media cumulatively accumulated and stored in association with said outcomes of the plurality of dice in said processing (C) on condition that an input indicating placement of the side bet has been made in said processing (A').

8. A control method of a gaming machine, comprising the steps of (A) accepting from an input device an input indicating placement of a normal bet of game media on outcomes of dice, (B) rolling and stopping a plurality of dice in a gaming portion, (C) cumulatively accumulating and storing, in a case where the normal bet has not been placed on the outcomes of the dice satisfying predetermined condition in said step (A), or in a case where the outcomes of the plurality of dice stopped in said step (B) do not satisfy the predetermined condition, a predetermined ratio of the game media which have been bet as the normal bet in said step (A) in association with respective outcomes of the dice satisfying the predetermined condition, and (D) offering the game media, irrespective of the game media cumulatively stored in (C), when the outcomes of the plurality of dice stopped in (B) are identical to the outcomes of the dice bet as the normal bet in (A); and, (E) offering the game media cumulatively stored in (C) and associated with the outcomes of the dice stopped in (B) satisfying the predetermined condition, when the outcomes of the plurality of dice stopped in (B) satisfy the predetermined condition, wherein each of said steps are conducted by a CPU that serves as a controller of the gaming machine.

9. The gaming machine according to claim 1, wherein processing (C) comprises processing of cumulatively accumulating and storing all the game media which have been bet as the normal bet in said processing (A).

10. The gaming machine according to claim 7, wherein processing (E) comprises processing of offering the game media, which have been cumulatively accumulated and stored in association with said outcomes of the plurality of dice in said processing (C), based on the amount of game media which have been bet as the normal bet in said processing (A) or the amount of game media which have been bet as the side bet in said processing (A'), in a case where the outcomes of the plurality of dice stopped in said processing (B) satisfy the predetermined condition.

11. The gaming machine according to claim 7, wherein processing (E) comprises processing of identifying the station whose number of game media which have been bet as the side bet from the input devices provided in each of the stations is the largest, and offering the game media cumulatively accumulated and stored in said processing (C) in the station, in a case where the outcomes of the plurality of dice stopped in said processing (B) satisfy the predetermined condition, and also there are a plurality of the stations each provided with the input device from which the input of the normal bet on the outcomes of the dice has been made in said processing (A) and the input of the side bet has been made in said processing (A').

* * * * *